United States Patent
Kawada

(10) Patent No.: US 7,698,362 B2
(45) Date of Patent: Apr. 13, 2010

(54) WEB SERVICE CONNECTING APPARATUS AND WEB SERVICE CONNECTING METHOD

(75) Inventor: Jun Kawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 850 days.

(21) Appl. No.: 11/489,619

(22) Filed: Jul. 20, 2006

(65) Prior Publication Data

US 2007/0038721 A1   Feb. 15, 2007

(30) Foreign Application Priority Data

| Aug. 1, 2005 | (JP) | 2005-222978 |
| Aug. 1, 2005 | (JP) | 2005-222979 |
| Jul. 12, 2006 | (JP) | 2006-191988 |
| Jul. 12, 2006 | (JP) | 2006-191989 |

(51) Int. Cl.
*G06F 15/16* (2006.01)

(52) U.S. Cl. .......................... 709/203; 709/220; 707/4; 707/1; 707/3; 707/10

(58) Field of Classification Search .................. 709/203, 709/220; 707/1, 3, 10, 4
See application file for complete search history.

(56) References Cited

U.S. PATENT DOCUMENTS

2004/0225660 A1* 11/2004 Carey et al. .................... 707/10

2005/0125378 A1* 6/2005 Kawada .......................... 707/1
2006/0095831 A1 5/2006 Kawada et al.

FOREIGN PATENT DOCUMENTS

| JP | 2004-171524 | 6/2004 |
| JP | 2004-171525 | 6/2004 |
| JP | 2004-272888 | 9/2004 |
| JP | 2004-274736 | 9/2004 |

* cited by examiner

*Primary Examiner*—Tammy T Nguyen
(74) *Attorney, Agent, or Firm*—Oblon, Spivak, McClelland, Maier & Neustadt, L.L.P.

(57) ABSTRACT

A connection setting part holds a selecting condition for a binding to use; a common interface part receives a connection request from a common interface execution code to be executed by a client; a reading/analyzing part obtains the selecting condition from the connection setting part; an environment information obtaining part obtains environment information of the client and/or a server; a connection selecting determination part determines the binding to use based on the selecting condition and the environment information; and a calling part carries out connection to the Web service with the execution code corresponding to the determined binding.

19 Claims, 45 Drawing Sheets

FIG.4

<OrderOfBindingPriority ServiceNameSpace="http://www.ricoh.co.jp/xmlns/soap/repository">

FIG.6

```
<AND>
    <OR><IPAddress>192.168.0.1</IPAddress><HostName>localhost</HostName></OR>
    <MinBitPerSec>10,000,000</MinBitPerSec>
</AND>
```

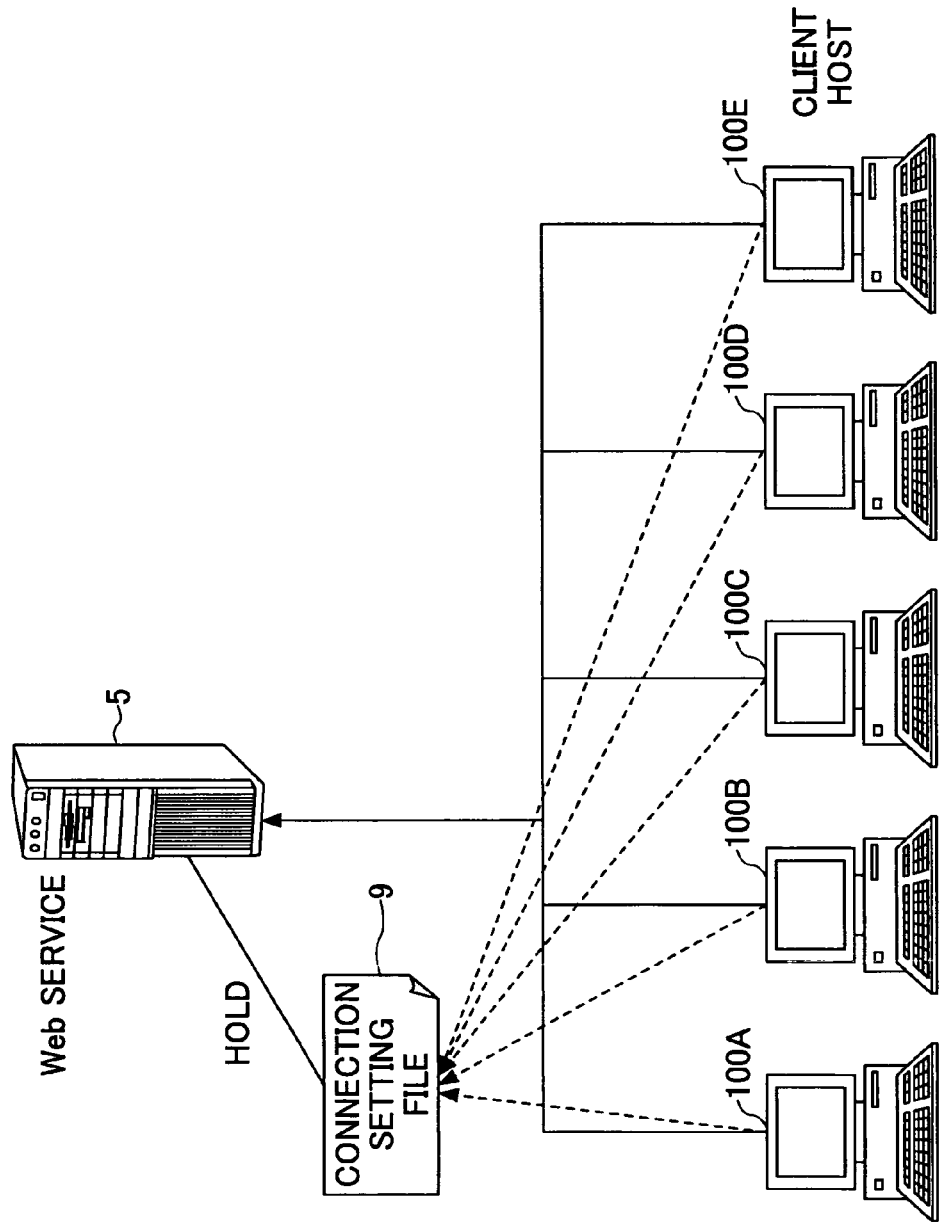

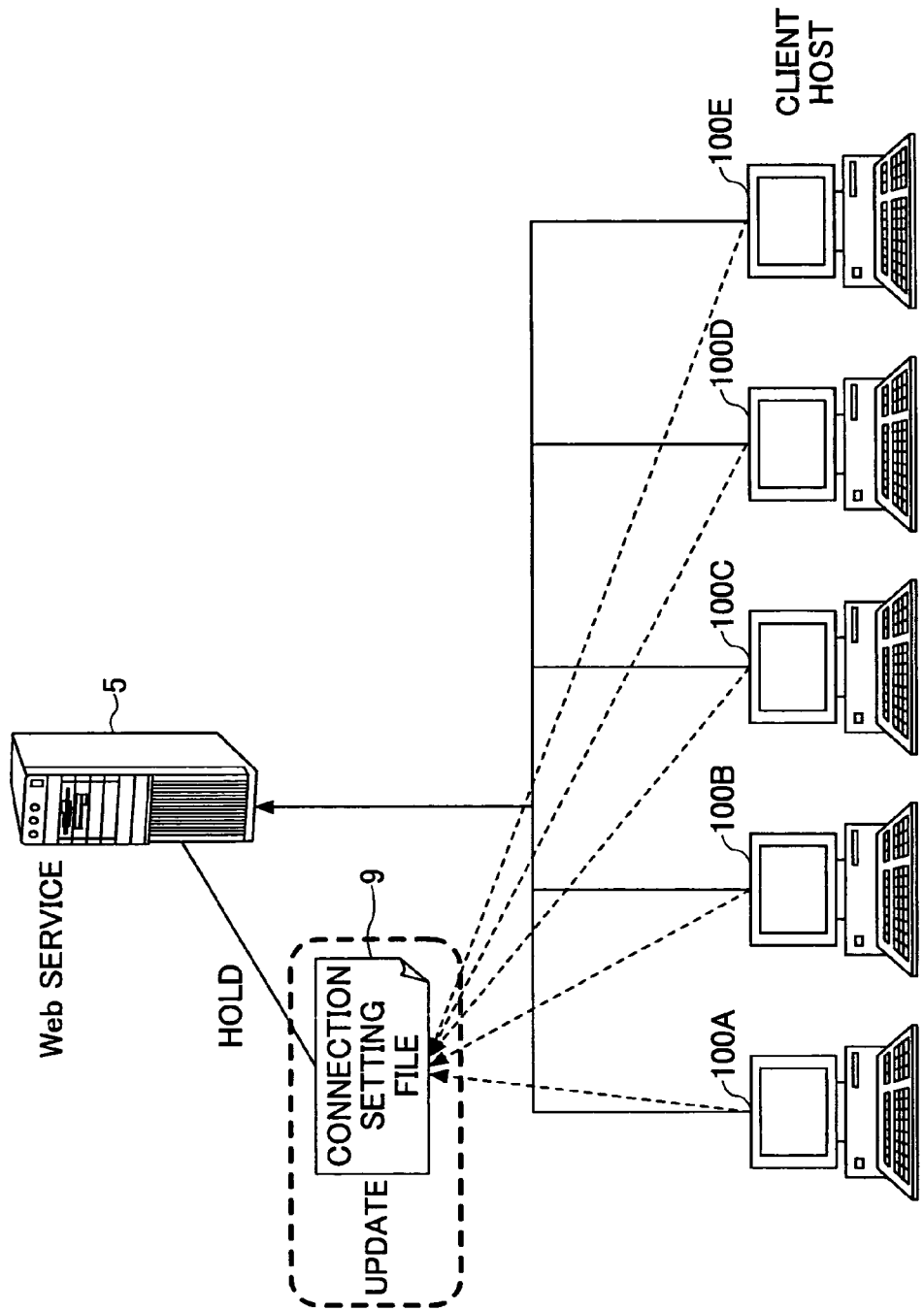

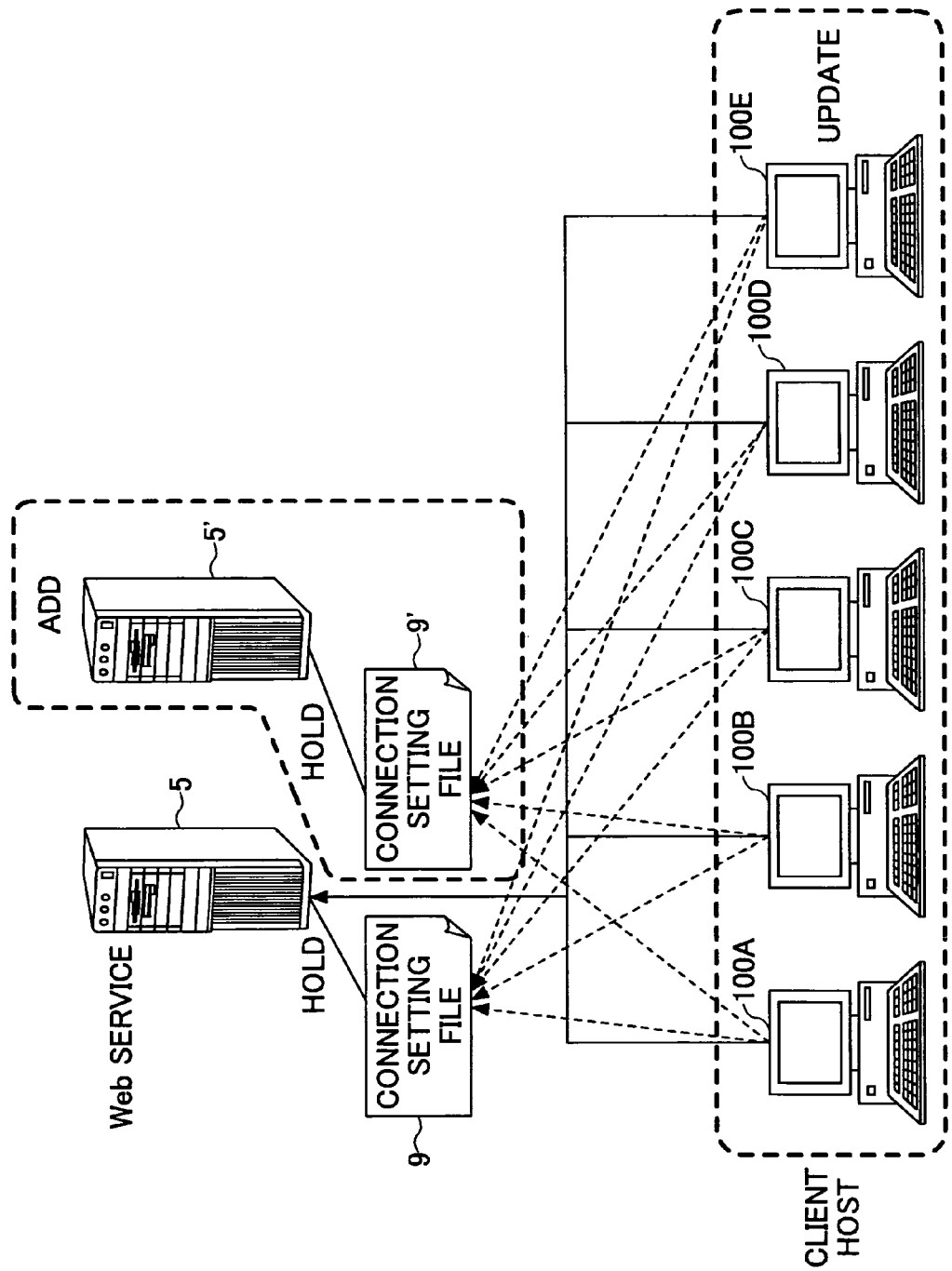

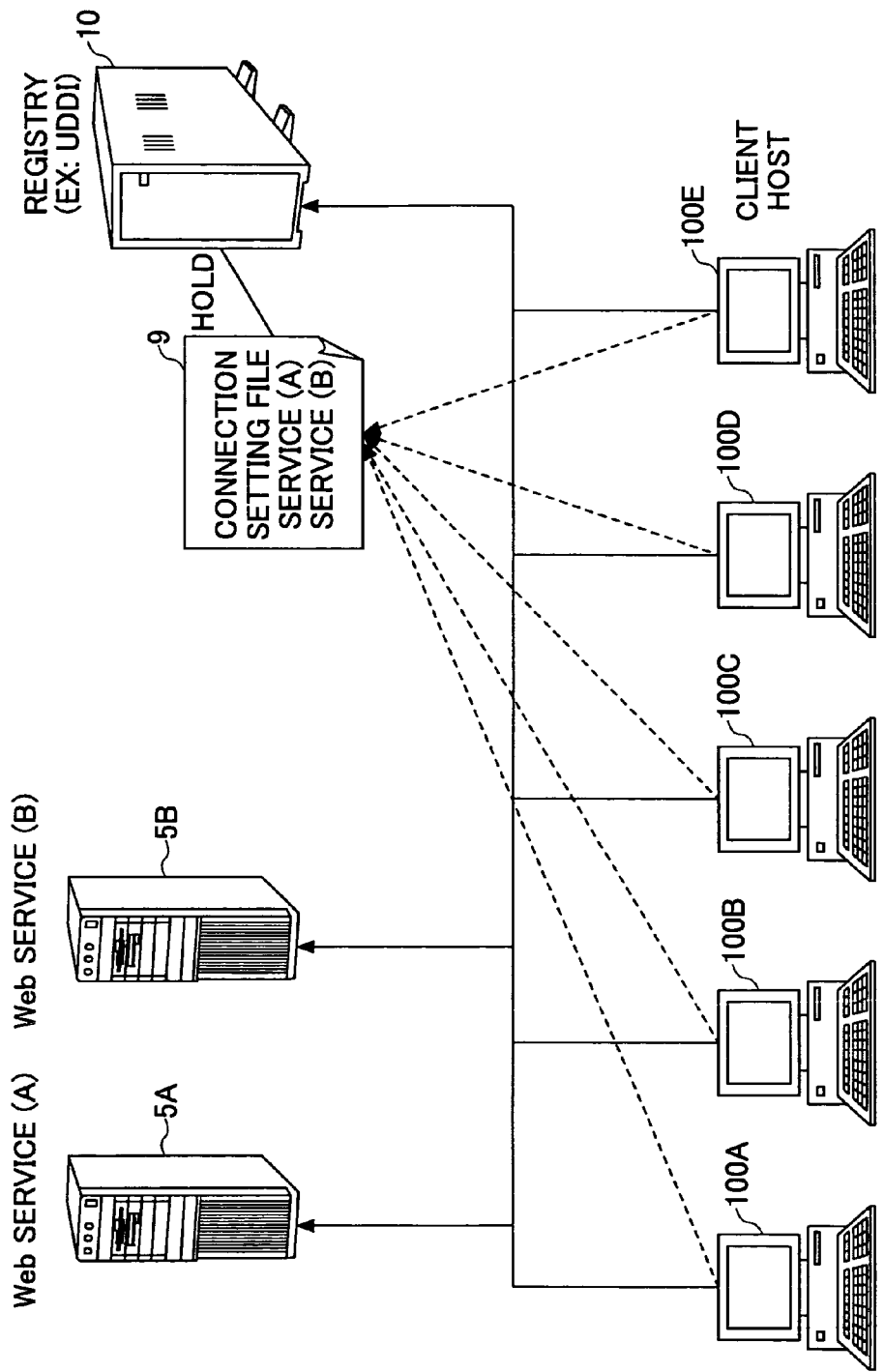

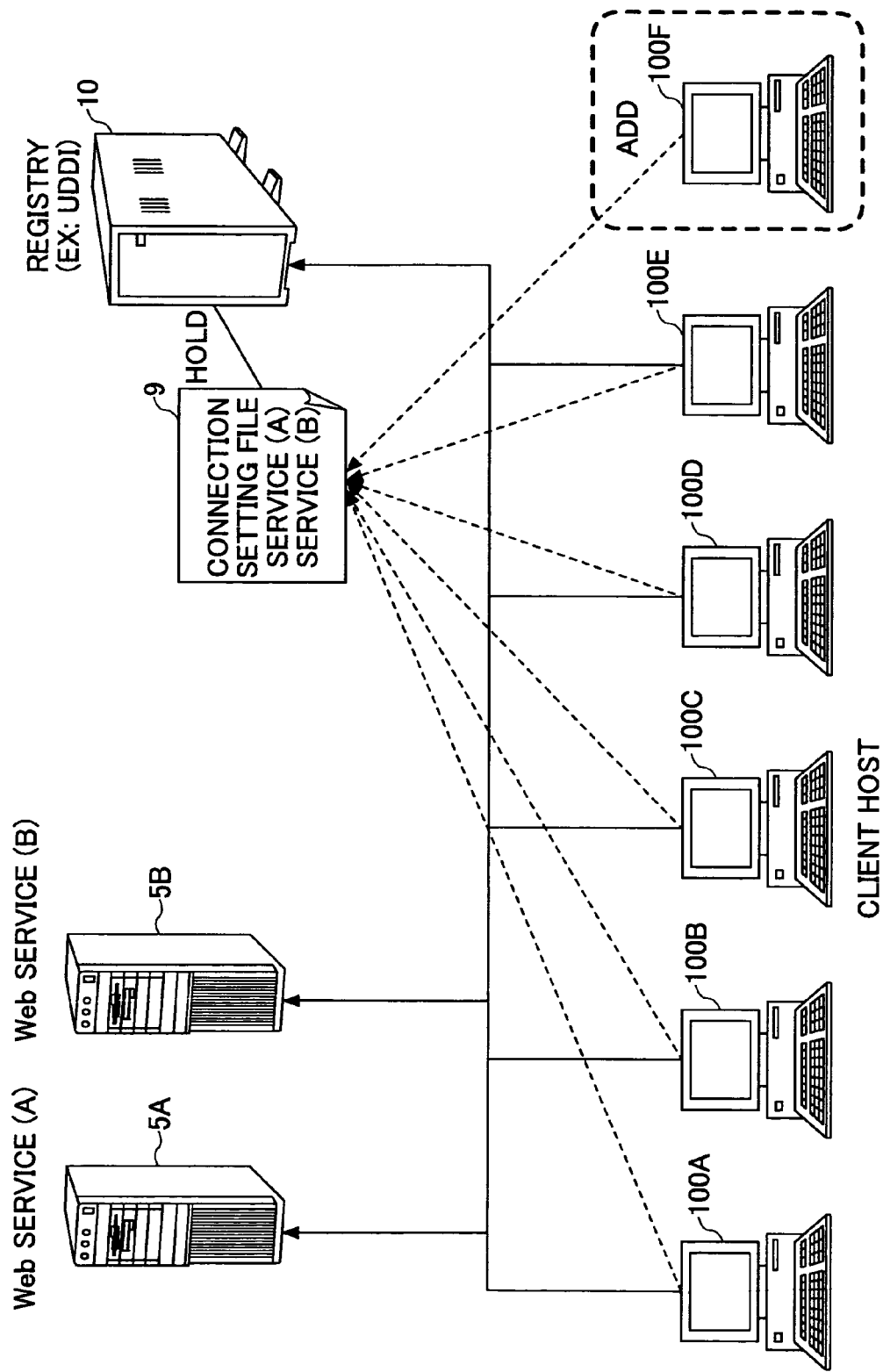

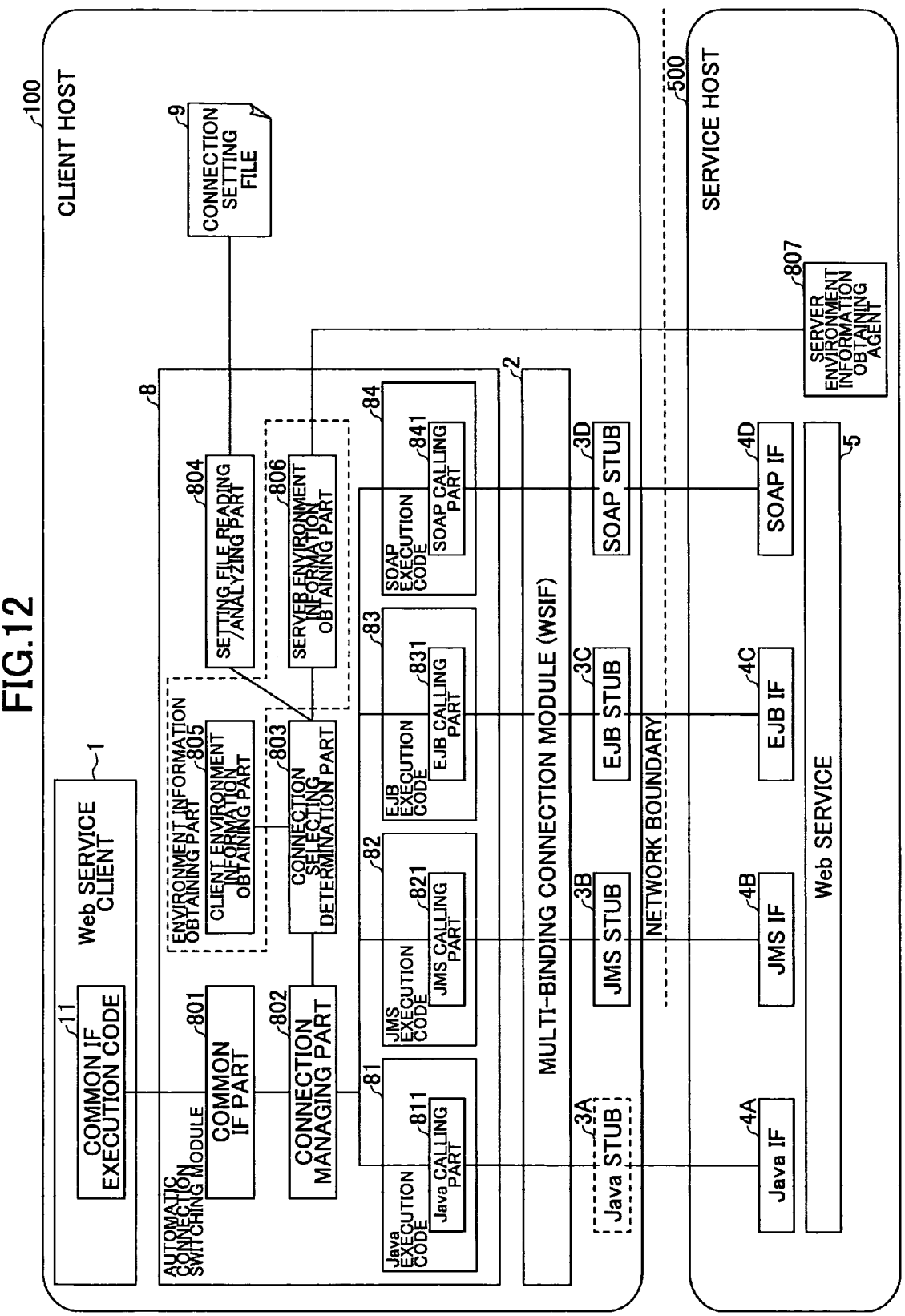

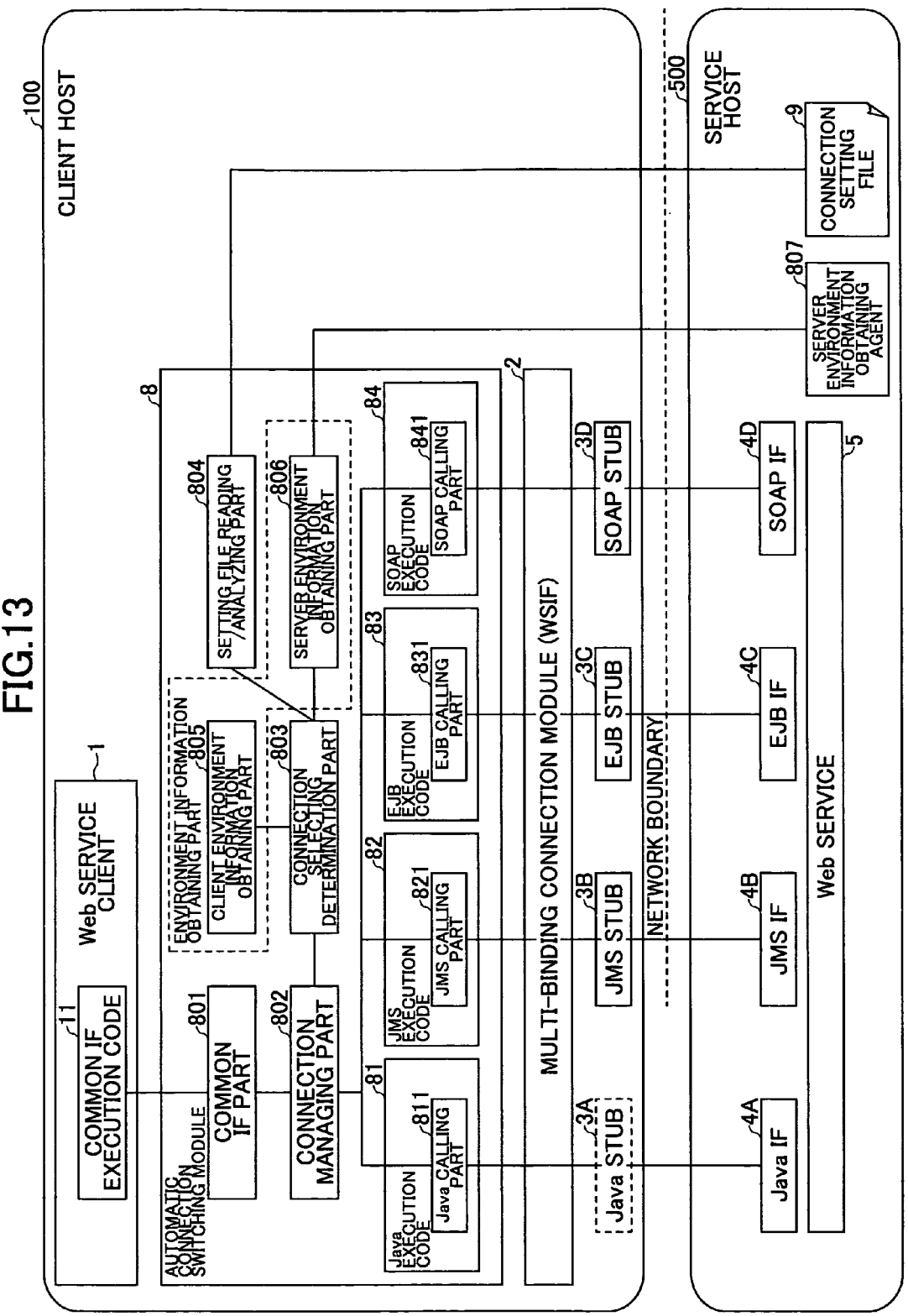

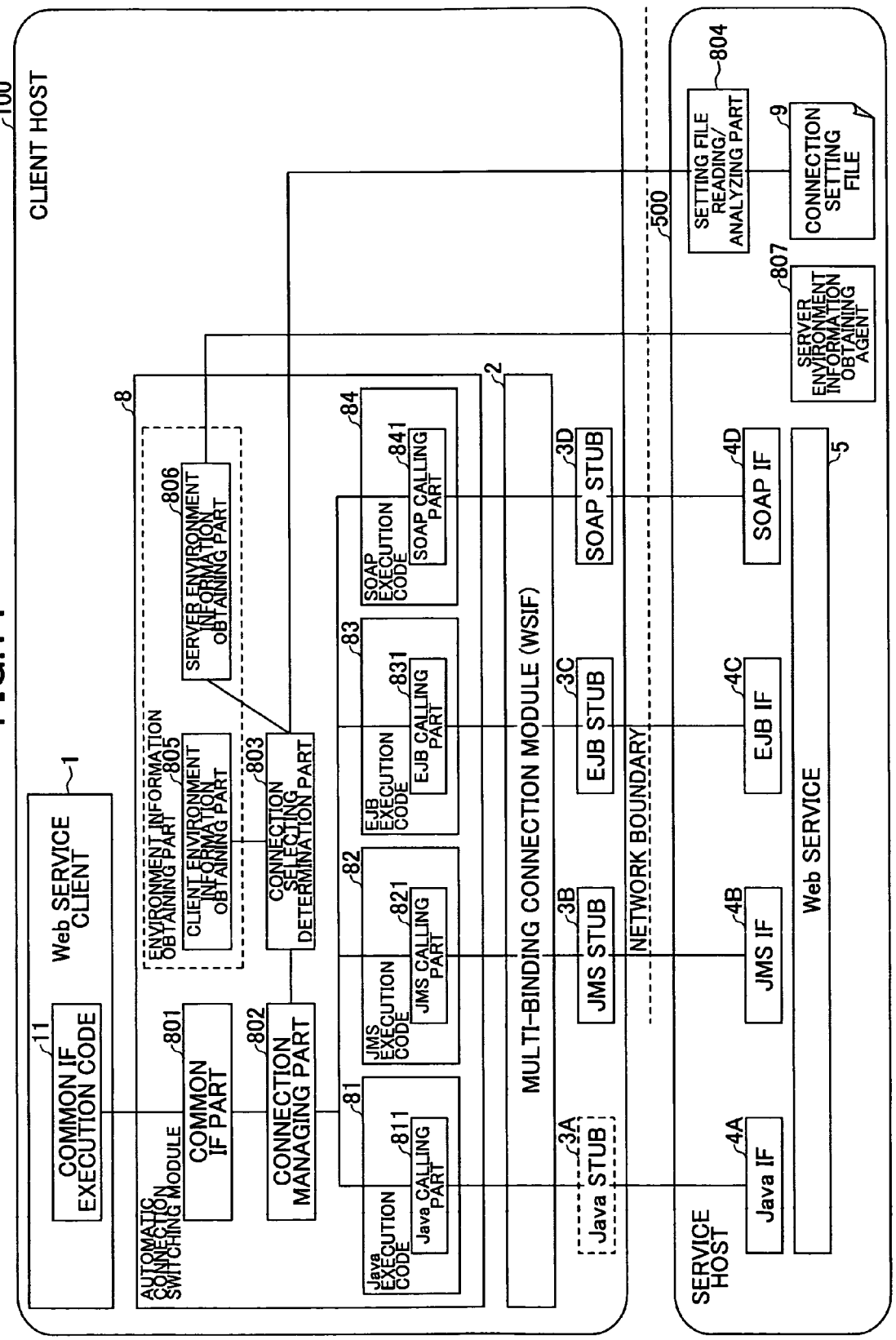

```
<?xml version='1.0' encoding='utf-8'?>
<xsl:stylesheet version="1.0" xmlns:xsl="http://www.w3.org/1999/XSL/Transform">
<xsl:output method="xml"/>

<xsl:template match="/">
    <WebServiceBindingConfiguration>
        <OrderOfBindingPriority>
            <xsl:apply-templates select="WebServiceBindingConfiguration/OrderOfBindingPriority/Binding"/>
        </OrderOfBindingPriority>
    </WebServiceBindingConfiguration>
</xsl:template>

<xsl:template match="Binding">
    <xsl:if test="Name[text()='JavaBinding']">
        <Binding>
            <xsl:copy-of select="Name"/>
            <Condition>
                <IPAddress>192.168.10.5</IPAddress>
            </Condition>
        </Binding>
    </xsl:if>
    <xsl:if test="Name[text()='EJBBinding']">
        <Binding>
            <xsl:copy-of select="Name"/>
            <xsl:copy-of select="Condition"/>
        </Binding>
    </xsl:if>
</xsl:template>

</xsl:stylesheet>
```

(b)

```
<?xml version='1.0'?>
<WebServiceBindingConfiguration>
    <OrderOfBindingPriority>
        <Binding>
            <Name>JavaBinding</Name>
            <Condition>
                <IPAddress>192.168.10.5</IPAddress>
            </Condition>
        </Binding>
        <Binding>
            <Name>EJBBinding</Name>
            <Condition>
                <DefaultBinding/>
            </Condition>
        </Binding>
    </OrderOfBindingPriority>
</WebServiceBindingConfiguration>
```

WEB SERVICE CONNECTING APPARATUS AND WEB SERVICE CONNECTING METHOD

BACKGROUND OF THE INVENTION

1. Field of the Invention

The present invention relates to a Web service connecting apparatus and a Web service connecting method for carrying out automatic switching of a Web service connection way according to an IP (internet protocol) address, an environment or such, when connecting to a Web service which provides a multi-binding function.

2. Description of the Related Art

A 'Web service' is an art for connecting to applications (components) dispersed through a network, with the use of the Internet standard technology. The respective applications themselves are also called 'Web services'.

In this regard, the following Patent Documents 1 through 4, listed below, discloses the related arts:

Patent Document 1: Japanese Laid-open Patent Application No. 2004-171524;
Patent Document 2: Japanese Laid-open Patent Application No. 2004-171525;
Patent Document 3: Japanese Laid-open Patent Application No. 2004-272888; and
Patent Document 4: Japanese Laid-open Patent Application No. 2004-274736)

For a case where the Web service is initially mounted, the remote Web service existing in a server connecting via a network and the local Web service existing in a client host are not distinguished therebetween, and thus, network communication and perpetration therefor are required each time when utilizing the Web service. As a result, the work efficiency may degrade.

Further, SOAP (simple object access protocol) communication is used many cases as a message technology applied when the Web service is used. However, SOAP requires a large quantity of data, and also, a time of analyzing XML (eXtensible Markup Language) is required there. As a result, depending on a particular environment, the work efficiency may degrade.

A multi-binding function is provided to solve the problem, which is realized by means of a WSIF (Web Service Invocation Framework). WSIF is a framework for achieving to call a Web service which provides a plurality of bindings (i.e., mappings to specific protocols, messages or such, from abstract operations or messages) from the side of the client.

FIG. 1 shows one example of a configuration of a Web service connecting mechanism in the related art based on the multi-binding. In FIG. 1, a Web service client 1A has a Java execution code mounted therein, a Web service client 1B has a JMS (Java Message Service) execution code mounted therein, a Web service client 1C has an EJB (Enterprise JavaBeans) execution code mounted therein, and a Web service client 1D has a SOAP execution code mounted therein. In this case, a multi-biding connection module 2 reads WSDL (Web Service Description Language) 6 describing a Web service, generates a stub 3A thorough 3D (Java stub 3A may be omitted) corresponding to the respective binding (a Java binding, a JMS binding, an EJB binding or a SOAP binding) statically or dynamically, connects to a corresponding interface (4A thorough 4D) via the corresponding stub (3A through 3D), and thus, actually uses the Web service.

There, from the Web service client 1A which exists within the same client host together with the Web server 5 itself, efficient connection is available with the use of the Java execution code without carrying out network communication, while, from the other Web service client 1B through 1D, efficient connection via the network is available in a way corresponding to the particular execution code mounted.

SUMMARY OF THE INVENTION

As described above, in the Web service connecting mechanism in the related art, the binding corresponding to the code on the Web service client side is selected from among the plurality of bindings provided by the Web service, so that the efficient connection way may be thus adopted. However, in this method, the selected binding depends from the code on the side of the Web service client. As a result, actual utilization of the Web service providing multi-binding may have a difficulty.

That is, the optimum binding may actually depend from the environment such as the host's capability, the network environment, a development process, or such. However, when the biding is to be changed, the code on the side of the Web service client should be rewritten accordingly, for which a complicate work may be required. Especially, when a plurality of Web service clients exist, the change should be reflected on all the clients, and thus, the total of the required works may increase much.

The present invention has been devised in consideration of the above-mentioned problem, and an object of the present invention is to provide a Web service connecting apparatus, a Web service connecting method, a Web service connecting program and a Web service connection developing framework, by which the optimum binding can be automatically selected.

In order to achieve the object, according to a first aspect of the present invention, a Web service connecting apparatus for connecting to a Web service which provides a multi-binding function, includes:

a connection setting part holding a selecting condition for a binding to use;

a common interface part receiving a connection request from a common interface execution code to be executed by a client;

a reading/analyzing part obtaining the selecting condition from the connection setting part;

an environment information obtaining part obtaining environment information of the client and/or a server;

a connection selecting determination part determining the binding to use based on the selecting condition and the environment information; and a calling part carrying out connection to the Web service with the execution code corresponding to the determined binding.

According to a second aspect of the present invention, in the Web service connecting apparatus in the above-mentioned first aspect of the present invention, the connection setting part may have an connection setting file described in XML.

According to a third aspect of the present invention, in the Web service connecting apparatus in the above-mentioned first aspect of the present invention, the connection setting part may have a description that a Java binding is used by priority when an IP address of the Web service to connect indicates a local host, and includes a description that any one of a SOAP binding, a JMS binding and an EJB binding is used by priority when the IP address indicates a remote host.

According to a fourth aspect of the present invention, in the Web service connecting apparatus in the above-mentioned first aspect of the present invention, the connection setting part may have a description that the binding to be used by priority is designated according to a communication rate between the client and the server.

According to a fifth aspect of the present invention, in the Web service connecting apparatus in the above-mentioned first aspect of the present invention, the connection setting part may have a description that the binding to be used by priority is designated according to whether or not an operating environment is a debug mode.

According to a sixth aspect of the present invention, in the Web service connecting apparatus in the above-mentioned first aspect of the present invention, the connection setting part may be held by the client.

According to a seventh aspect of the present invention, in the Web service connecting apparatus in the above-mentioned first aspect of the present invention, the connection setting part is held by the server and read by the client.

According to an eighth aspect of the present invention, in the Web service connecting apparatus in the above-mentioned first aspect of the present invention, the connection setting part may be held by a group of clients, and also may be held by the server for another group of clients, which may be then read by the another group of clients.

According to a ninth aspect of the present invention, in the Web service connecting apparatus in the above-mentioned first aspect of the present invention, the connection setting part may be held by a service registry host, and may be read by the client.

According to a tenth aspect of the present invention, in the Web service connecting apparatus in the above-mentioned first aspect of the present invention, the connection setting part may be held by the service registry host, may be read by the client, and also, may be held by a group of clients.

According to an eleventh aspect of the present invention, in the Web service connecting apparatus in the above-mentioned first aspect of the present invention, the reading/analyzing part may be provided in the client.

According to a twelfth aspect of the present invention, in the Web service connecting apparatus in the above-mentioned first aspect of the present invention, the reading/analyzing part may be provided in the server.

According to a thirteenth aspect of the present invention, in the Web service connecting apparatus in the above-mentioned first aspect of the present invention, the environment information obtaining part may have a client environment information obtaining part for obtaining the environment information of the client.

According to a fourteenth aspect of the present invention, in the Web service connecting apparatus in the above-mentioned first aspect of the present invention, the environment information obtaining part may have a server environment information obtaining part for obtaining the environment information of the server.

According to a fifteenth aspect of the present invention, in the Web service connecting apparatus in the above-mentioned fourteenth aspect of the present invention, the server environment information obtaining part may obtain the environment information of the server via a server environment information obtaining agent provided in the server.

According to a sixteenth aspect of the present invention, in the Web service connecting apparatus in the above-mentioned first aspect of the present invention, the common interface part may separate initialization and service execution, and may carry out initialization only once before executing the service execution.

According to a seventeenth aspect of the present invention, in the Web service connecting apparatus in the above-mentioned first aspect of the present invention, the common interface part may carry out initialization and service execution at the same time.

According to an eighteenth aspect of the present invention, in the Web service connecting apparatus in the above-mentioned seventeenth aspect of the present invention, the initialization and the service execution may be carried out by separate methods.

According to a nineteenth aspect of the present invention, in the Web service connecting apparatus in the above-mentioned seventeenth aspect of the present invention, the initialization and the service execution may be carried out by a single method.

According to a twentieth aspect of the present invention, a Web service connecting method for connecting to a Web service which provides a multi-binding function, includes the steps of:

holding a selecting condition for a binding to use;

receiving a connection request from a common interface execution code to be executed by a client;

obtaining environment information of the client and/or a server;

determining the binding to use based on the selecting condition and the environment information; and carrying out connection to the Web service with the execution code corresponding to the determined binding.

According to a twenty-first aspect of the present invention, a Web service connecting program for connecting to a Web service which provides a multi-binding function, has instructions for causing a computer to function as:

connection setting means for holding a selecting condition for a binding to use;

common interface means for receiving a connection request from a common interface execution code to be executed by a client;

reading/analyzing means for obtaining the selecting condition from the connection setting means;

environment information obtaining means for obtaining environment information of the client and/or a server;

connection selecting determination means for determining the binding to use based on the selecting condition and the environment information; and calling means for carrying out connection to the Web service with the execution code corresponding to the determined binding.

According to a twenty-second aspect of the present invention, a Web service connection developing framework for configuring a connecting mechanism for connecting to a Web service which provides a multi-binding function, has:

a first module generating a connection setting part holding a selecting condition for a binding to use;

a second module configuring a common interface part receiving a connection request from a common interface execution code to be executed by a client;

a third module configuring a reading/analyzing part obtaining the selecting condition from the connection setting part;

a fourth module configuring an environment information obtaining part obtaining environment information of the client and/or a server;

a fifth module configuring a connection selecting determination part determining the binding to use based on the selecting condition and the environment information; and a sixth module configuring a calling part carrying out connection to the Web service with the execution code corresponding to the determined binding.

According to a twenty-third aspect of the present invention, in the Web service connecting apparatus in the above-mentioned twenty-second aspect of the present invention, the first, second, third, fourth, fifth and sixth modules may be provided as jar files or dll files According to a twenty-fourth aspect of the present invention, in the Web service connecting apparatus in the above-mentioned twenty-second aspect of the present invention, the common interface part, the reading/analyzing part, the environment information obtaining part, the connection selecting determination part and the calling part may be included in a class definition as components.

In the Web service connecting apparatus, the Web service connecting method, the Web service connecting program and the Web service connection developing framework according to the present invention, the optimum binding can be automatically selected depending on a given environment.

Other objects and further features of the present invention will become more apparent from the following detailed description when read in conjunction with the accompanying drawings:

BRIEF DESCRIPTION OF DRAWINGS

FIG. 4 shows an example of an element OrderOfBindingPriority including an attribute ServiceNameSpace;

FIG. 6 shows an element Condition;

FIG. 8A shows one example of a case where the connection setting file is managed by the side of a server;

FIG. 8B shows one example of setting change in the case where the connection setting file is managed by the side of the server;

FIG. 8D shows one example of adding a Web service in the case where the connection setting file is managed by the side of the server;

FIG. 10A shows one example of a case where the connection setting file is managed by the side of a registry host;

FIG. 10C shows one example of adding a client in the case where the connection setting file is managed by the side of the registry host;

FIGS. 12 through 16 show examples of further detailed configurations of the Web service connection mechanism;

DETAILED DESCRIPTION OF THE PREFERRED EMBODIMENT

A preferred embodiment of the present invention will now be described in detail.

Figure 1:
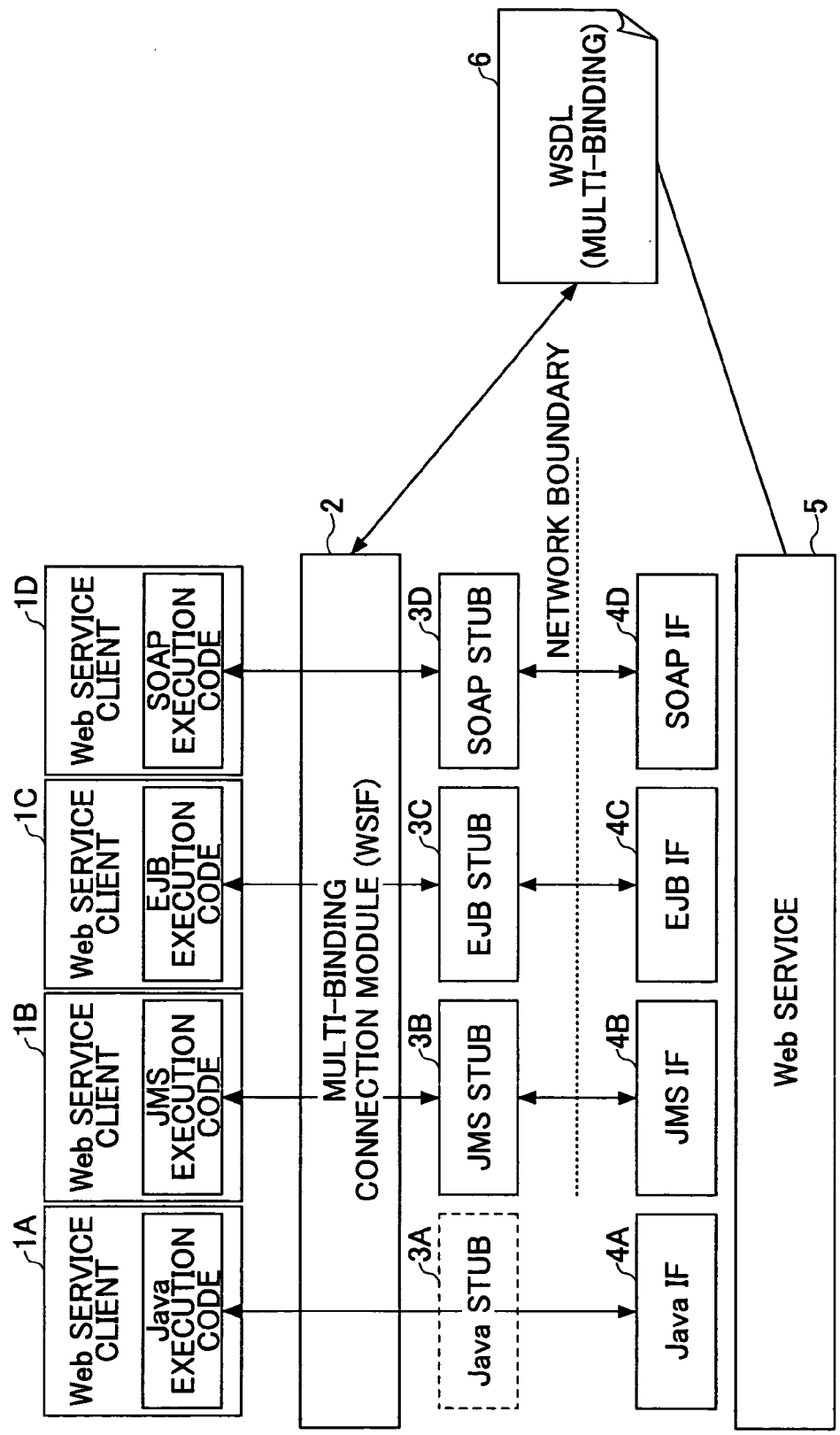
FIG. 1 shows an example of a Web service connecting mechanism in the related art.
Figure 2:
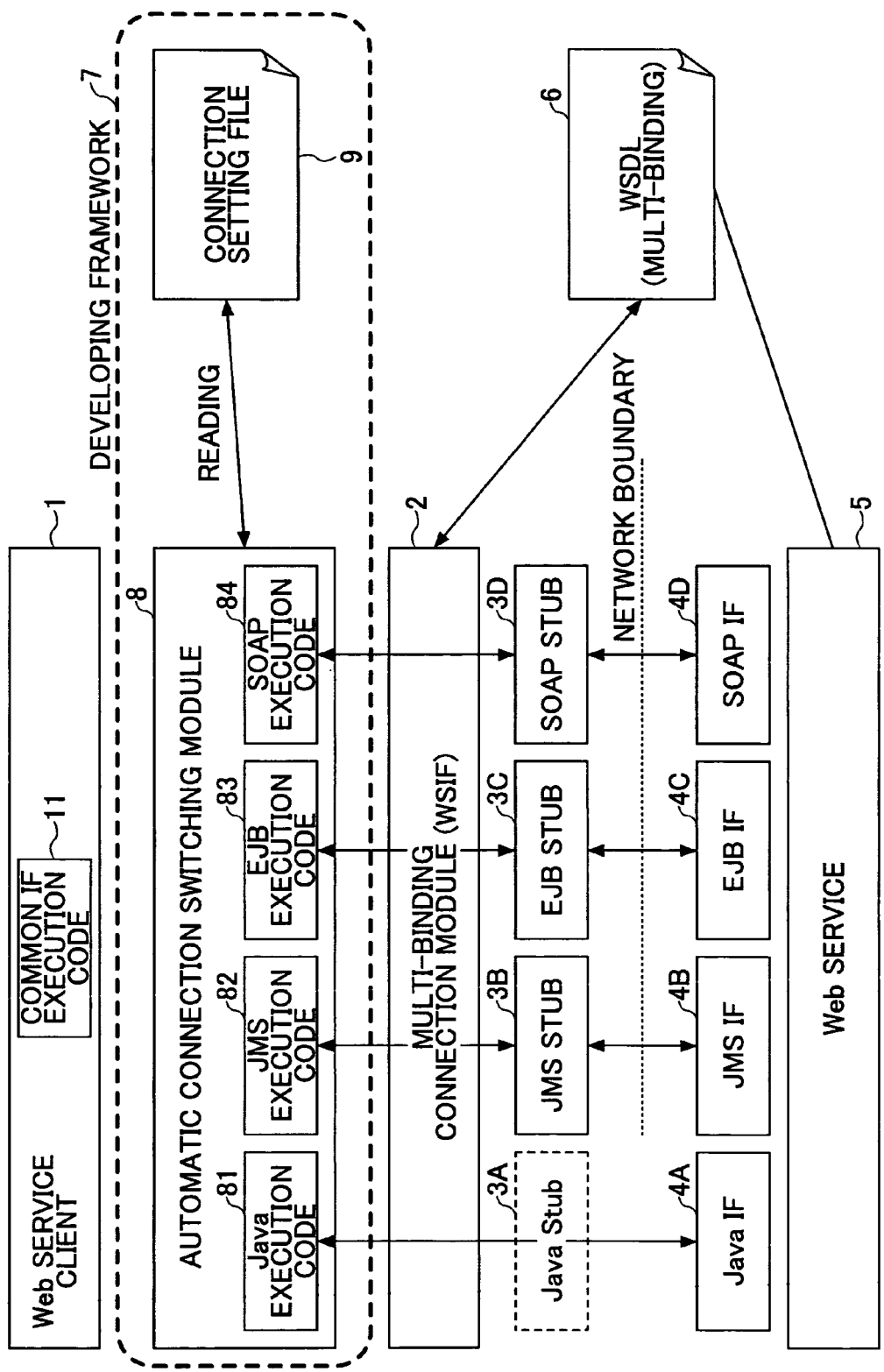
FIG. 2 shows an example of a Web service connecting mechanism in one embodiment of the present invention.

FIG. 2 shows an example of a Web service connection mechanism according to one embodiment of the present invention. In FIG. 2, in a Web service client 1, a common interface execution code 11 is mounted, and, is connected with a multi-binding connection module 2, by means of an automatic connection switching module 8 provided by a developing framework 7. The automatic connection switching module 8 reads set contents of a connection setting file 9 also provided by the developing framework 7, and selects from among a Java execution code 81, a JMS execution code 82, an EJB execution code 83 and a SOAP execution code 84 appropriately. The multi-binding connection module 2 reads WSDL 6 describing a Web service, statically or dynamically generates a stub 3A through 3D (Java stub 3A may be omitted) corresponding to the respective binding (Java binding, JMS binding, EJB binding or SOAP biding), connects to an interface of the side of the Web service 5 by means of the corresponding stub 3A through 3D, and thus, connects with the Web service 5.

Figure 3:
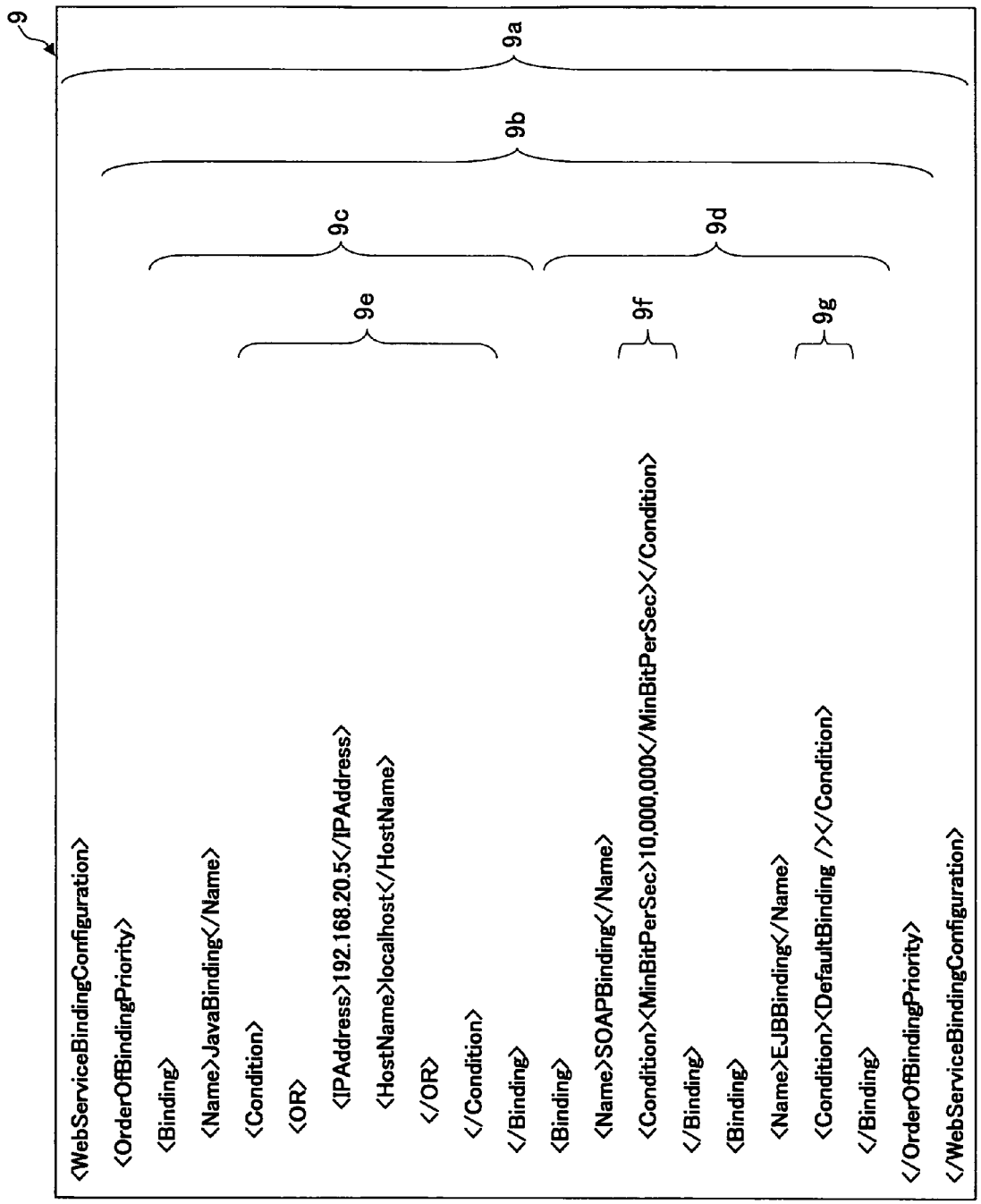
FIG. 3 shows an example of a connection setting file described in XML.

FIG. 3 shows an example of the connection setting file 9 described by XML. In FIG. 3, the connection setting file 9 has, as a route element, a 'WebServiceBindingConfiguration' element 9a, and, as a child element, an 'OrderOfBindingPriority' element 9b listing selective bindings in a priority order (to be evaluated in an appearance order). As shown in FIG. 4, the 'OrderOfBindingPriority' element 9b may include 'ServiceNameSpace (service name space)' corresponding to the set target Web service as an attribute. When it is not included, it is treated as a predetermined default setting.

Figure 5:
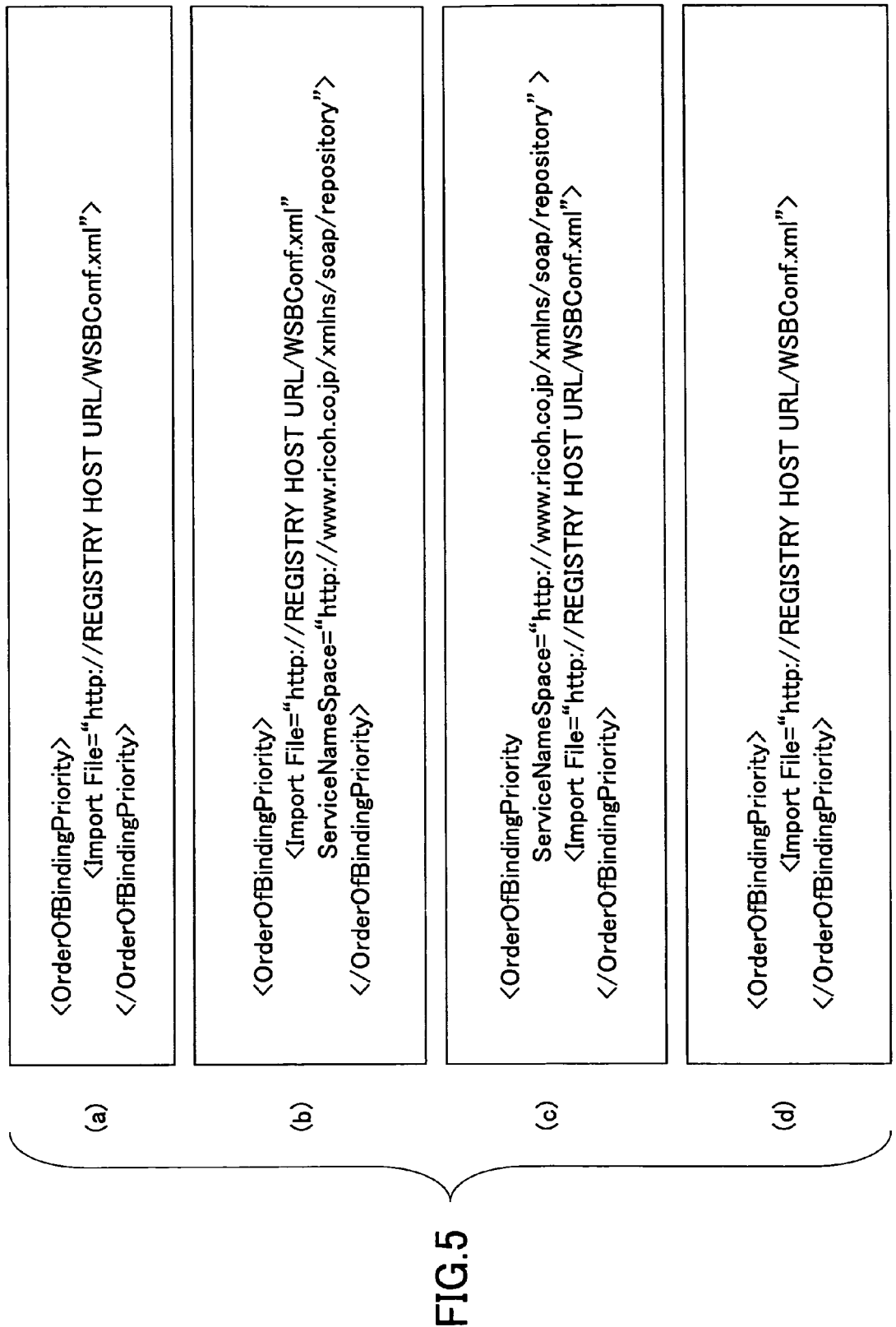
FIG. 5 shows an example of an element Import.

In FIG. 3, the 'OrderOfBindingPriority' element 9b has, as child elements, a plurality of (>0) 'Binding' elements 9c, 9d describing particular bindings in a case where unique setting is made there. When an external setting is read, one 'Import' element is included. FIG. 5 (a) shows one example of the 'Import' element, in which a path (URL (Uniform Resource Locator) or such) is designated for reading the external connection setting file 9, which is a mandatory attribute. Further, as shown in FIG. 5 (b), the 'Import' element may have an additional designation for 'ServiceNameSpace' attribute. As shown in FIG. 5 (c), the 'ServiceNameSpace' element of the ancestor element 'OrderOfBindingPriority' is taken over when the 'ServiceNameSpace' attribute is designated in the 'OrderOfBindingPriority' attribute, and the 'ServiceNameSpace' attribute is not designated in the 'Import' attribute as shown in FIG. 5 (c). The default set information is read when the 'ServiceNameSpace' attribute is designated neither in the 'Import' attribute nor in the 'OrderOfBindingPriority' attribute as shows in FIG. 5 (d).

In FIG. 3, the 'Binding' elements 9c and 9d have, as attributes, Name (i.e., a binding name such as 'JavaBinding', 'SOAPBinding', 'EJBBinding', 'JMSBinding' or such), and has, as child elements, 'Condition' elements 9e, 9f, 9g which are elements describing conditions for determining the particular bindings. The 'Condition' element 9e uses OR (logical summation) and describes that the condition is met when the IP address has a predetermined value, or, the host name is 'localhost'. Other than OR, AND (logical product) may be used. Also, a configuration where OR and have a nested relationship may be applied. FIG. 6 shows an example in which OR is nested in AND. In FIG. 3, the 'Condition' element 9f has an actual measured value of a transfer rate with the use of an application designated as the condition. The 'Condition' element 9g is prepared such that, when all the conditions are not met, default binding is selected. It is also possible to set the default by omitting the 'Condition' element itself instead of using the 'DefaultBinding'. Thus, it is possible to designate the condition, as the 'Condition' element, by IPAddress (IP address of the server), HostName (host name of the server), MinBitPerSec/MaxBitPerSec (communication rate between the client and the server), DebugMode (operation environment is a debug mode (see log4j property or such)), DefaultBinding (to designate the default binding), or such.

FIGS. 7A through 10D show examples of arrangement of the connection setting file 9.

Figure 7A:
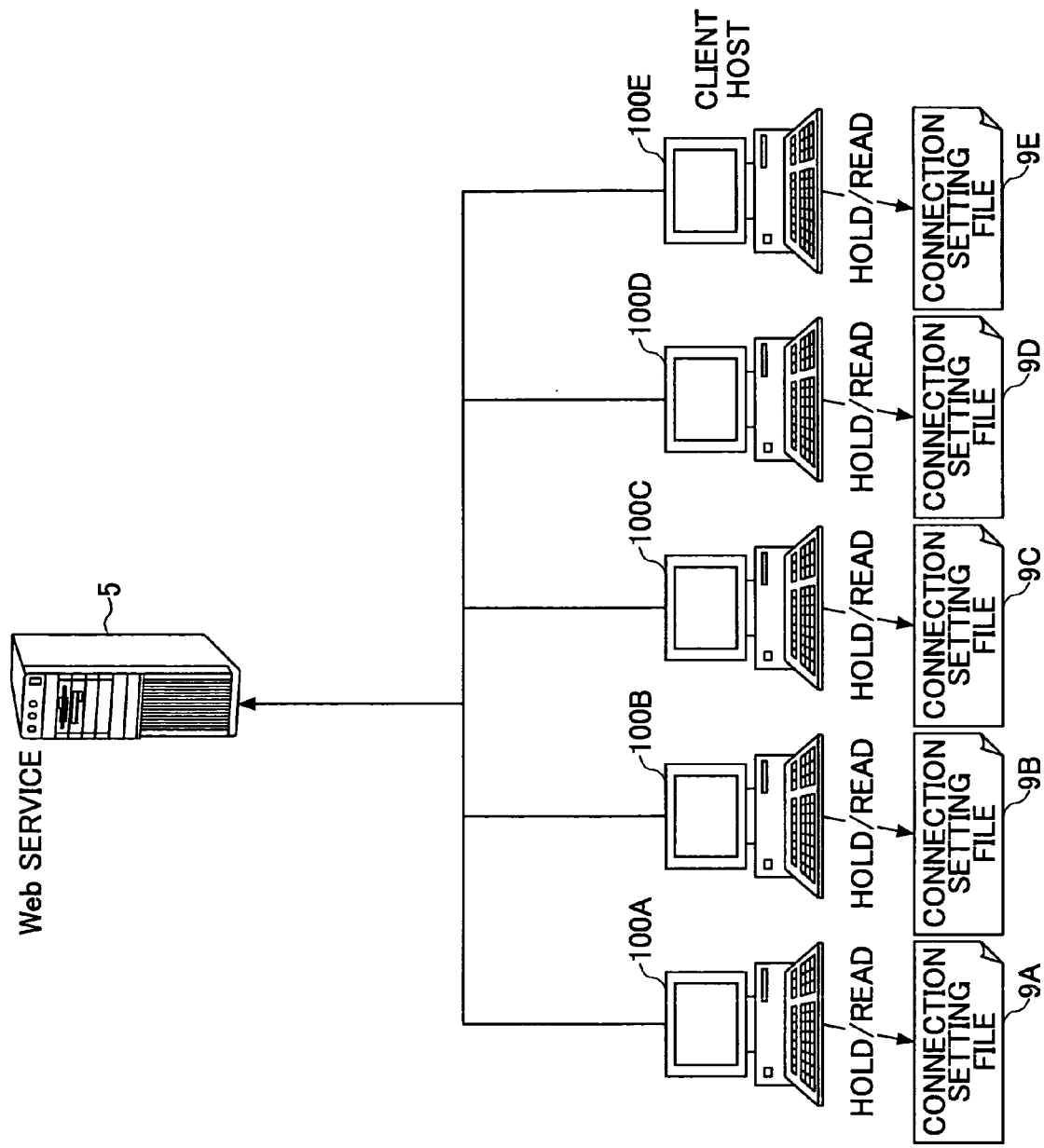
FIG. 7A shows one example of a case where the connection setting file is managed by the side of a client.
Figure 7B:
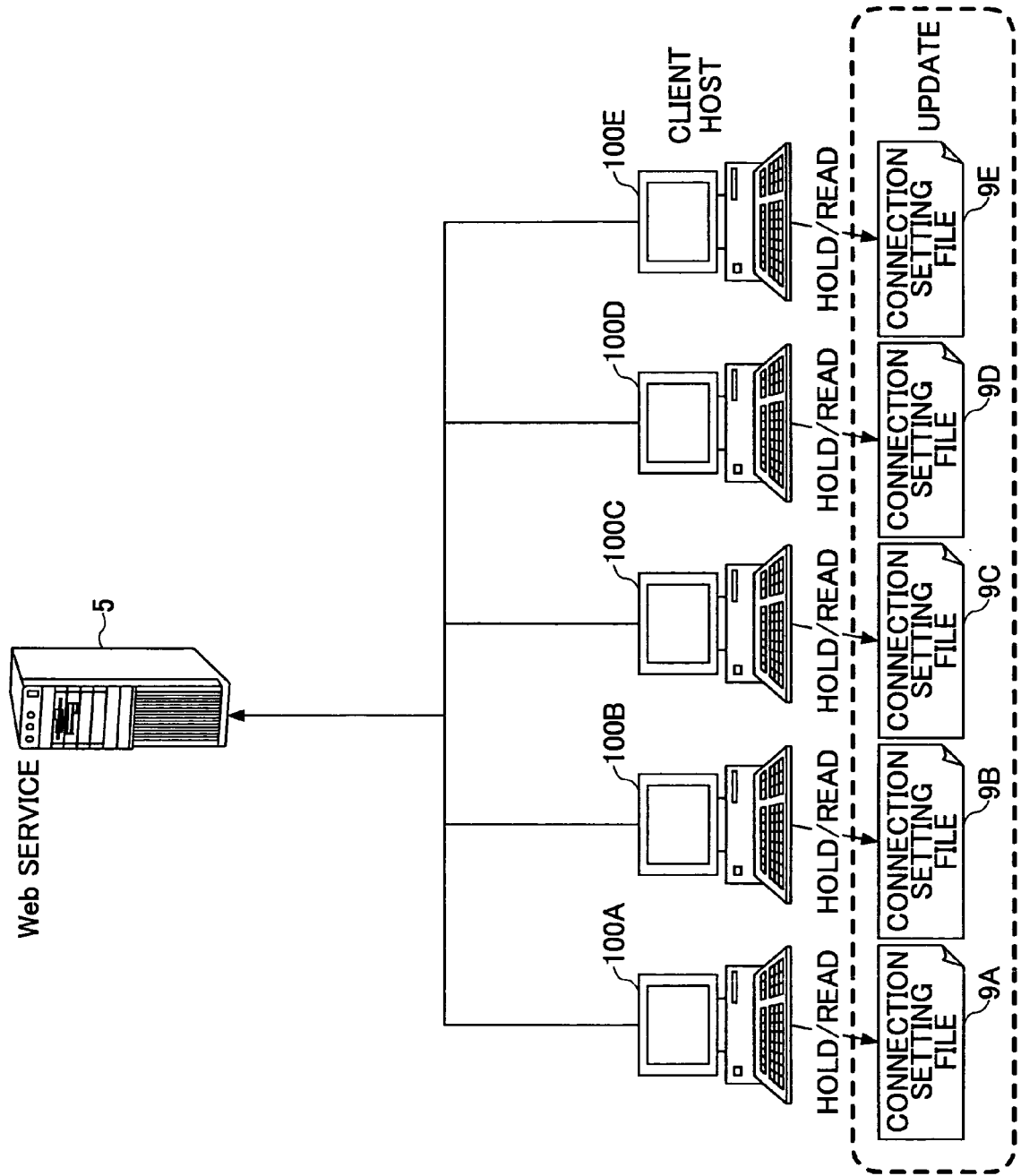
FIG. 7B shows one example of setting change in the case where the connection setting file is managed by the side of the client.
Figure 7C:
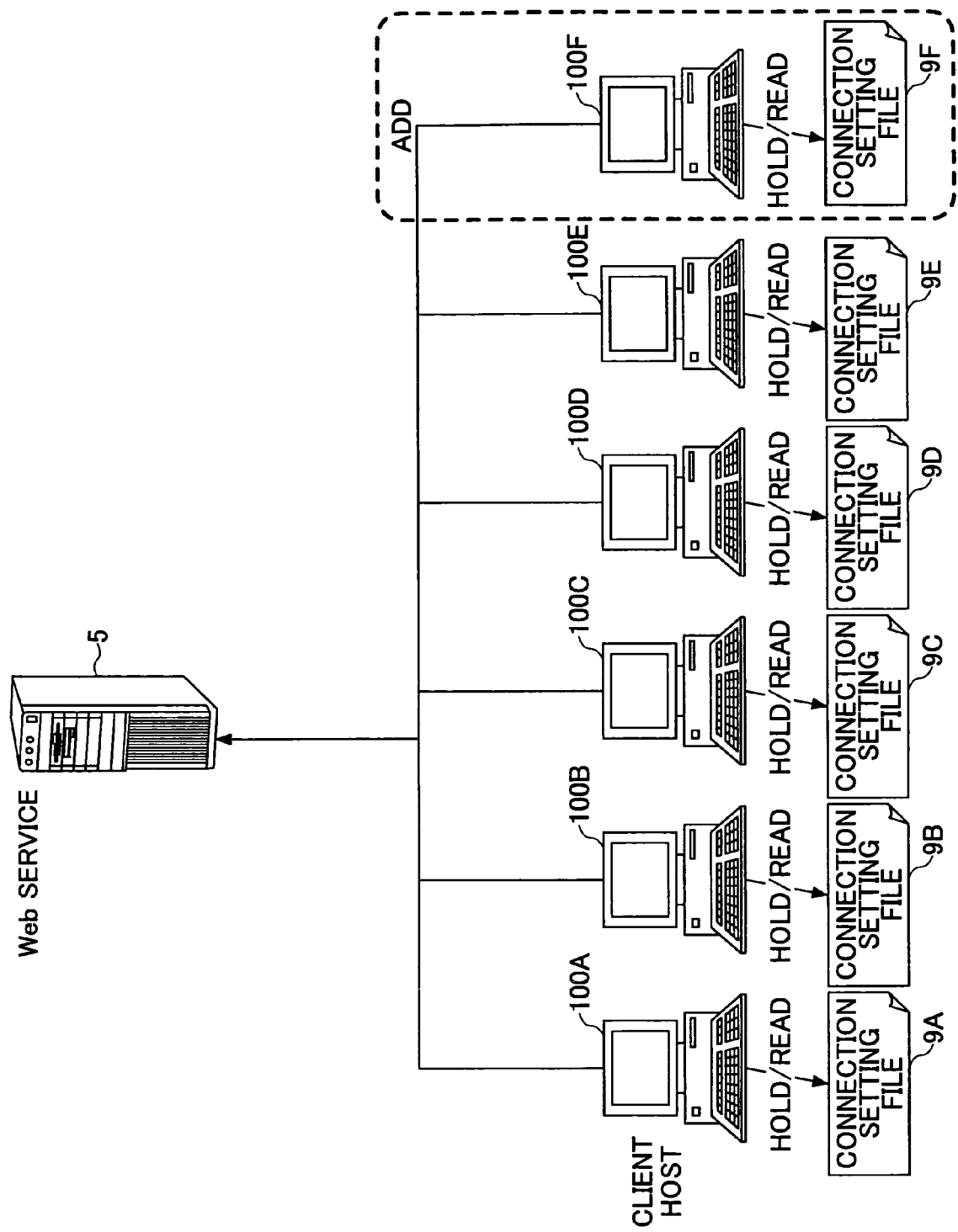
FIG. 7C shows one example of adding a client in the case where the connection setting file is managed by the side of the client.
Figure 7D:
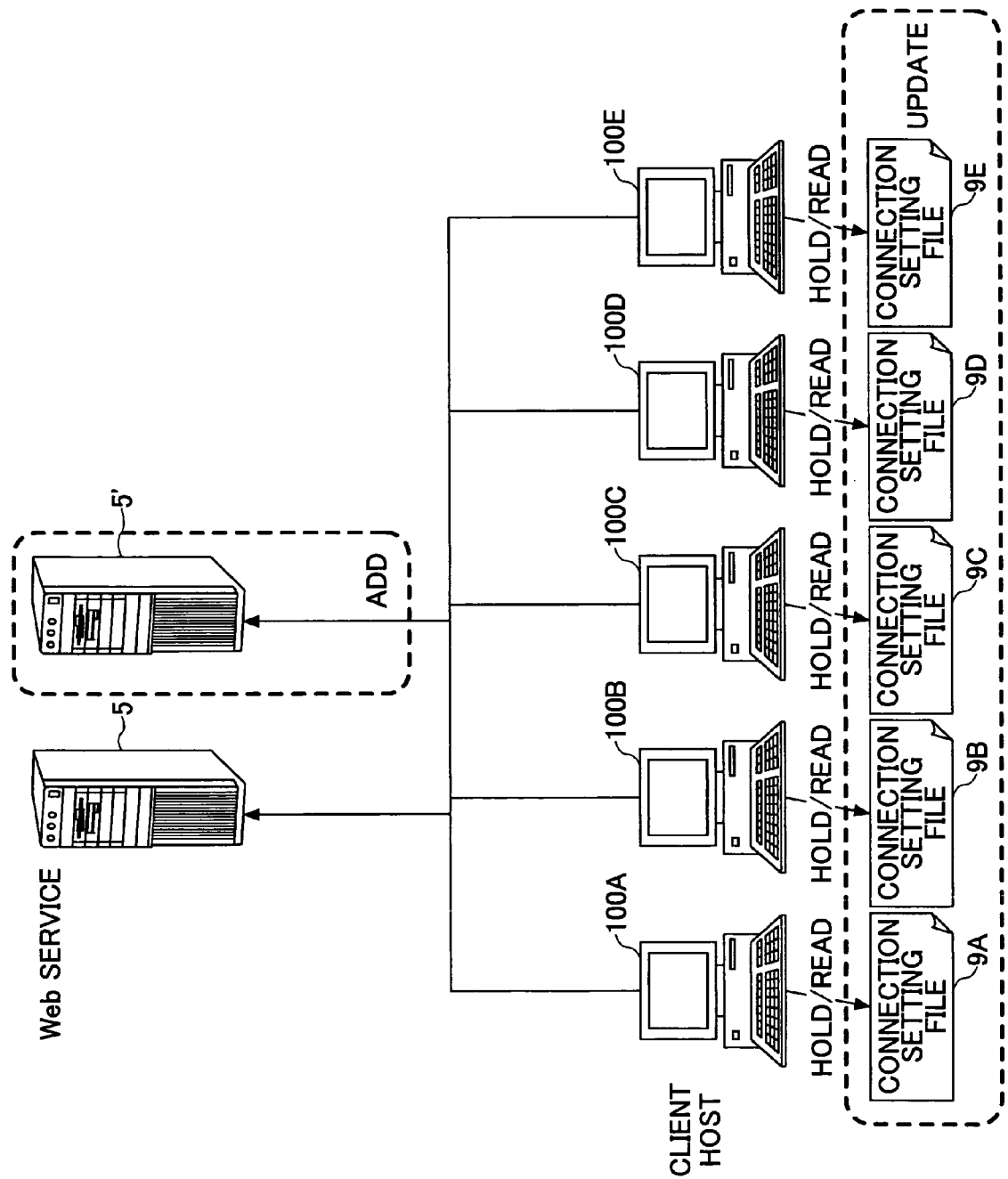
FIG. 7D shows one example of adding a Web service in the case where the connection setting file is managed by the side of the client.

FIG. 7A shows an example in which the connection setting file is managed by the clients, the connection setting files 9A through 9E are disposed on the side of the client hosts 100A through 100E, respectively, to be held and read. In this case, it is advantageous that the client side can uniquely set the condition. However, it is necessary to change the settings of all the clients when a change in the environment such as services, network or such occurs. This configuration can be easily introduced, and is suitable for a case where the number of services is relatively small, an increasing rate thereof is small, the number of clients is small and an increasing rate thereof is small. FIG. 7B shows an example of a change of the condition. When the condition is changed, all of the connection setting files 9A through 9E of the client hosts 100A through 100E should be changed accordingly. FIG. 7C shows an example of adding a client. When the client is added, the connection setting file 9F is newly produced in the newly added client host 100F. FIG. 7D shows an example of adding a Web service. When the Web service 5' is added, all the connection setting files 9A through 9E of the client hosts 100A through 100E should be updated accordingly.

Figure 8C:
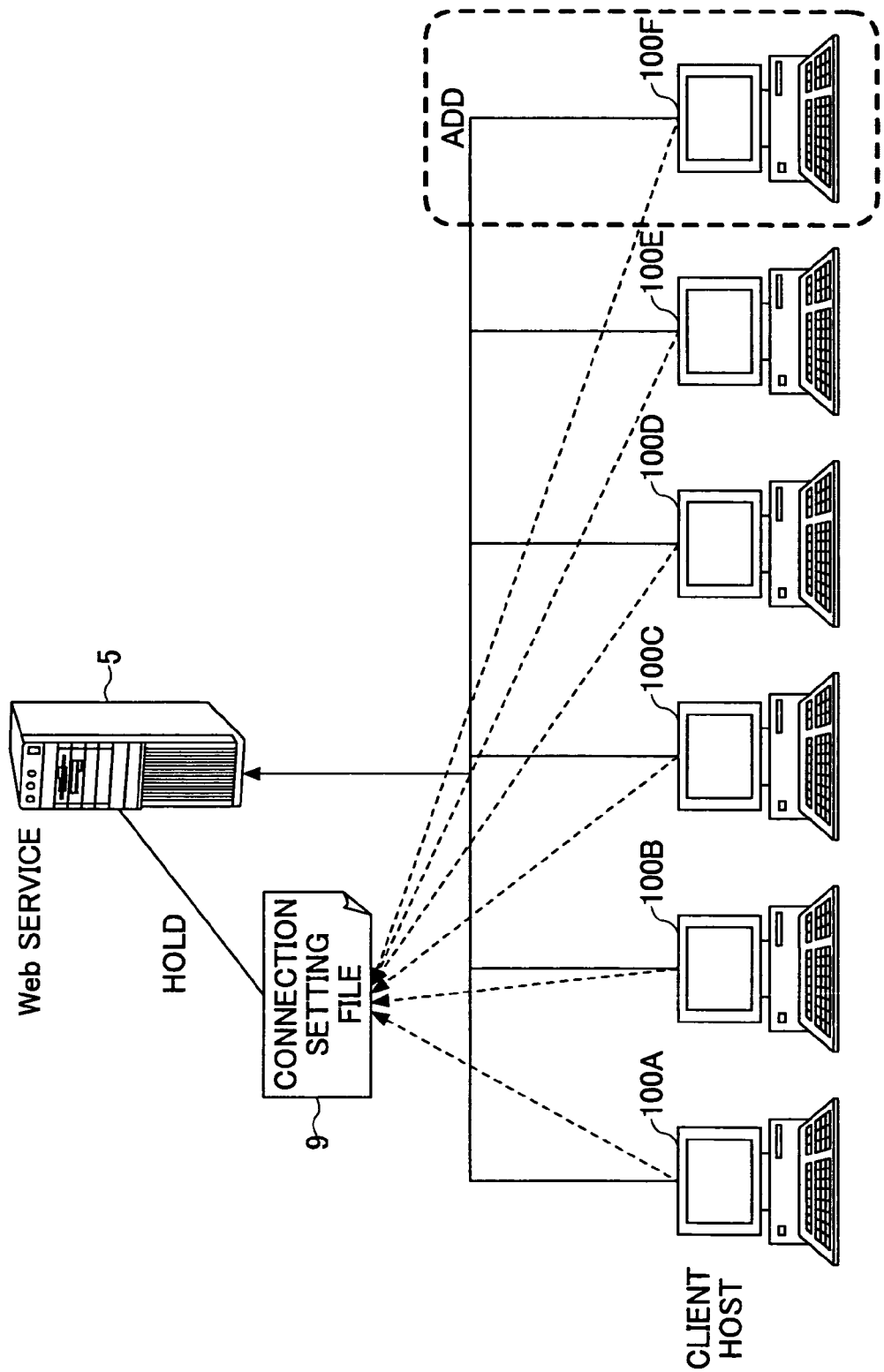
FIG. 8C shows one example of adding a client in the case where the connection setting file is managed by the side of the server.

FIG. 8A shows an example in which the condition setting file is managed by the server side. In this case, the connection setting file 9 is disposed on the side of the Web service 5, and is read by the client hosts 100A through 100E with the use of the corresponding URL or such. In this case, merely the single connection setting file 9 should be changed, if necessary, for all the client hosts 100A through 100E. However, the client side cannot have its unique setting. This configuration is suitable for a case where the number of services is small, an increasing rate thereof is small, the number of clients is large and an increasing rate thereof is large. FIG. 8B shows an example of a change in the condition. When the condition is changed, merely the connection setting file 9 on the side of the Web service 5 should be updated accordingly. FIG. 8C shows an example of adding a client. When the client host 100F is added, the accessing destination for the connection setting file 9 (URL or such) should be designated in the newly added client host 100F. FIG. 8D shows an example of adding a Web service. When the Web service 5' is added, the connection setting file 9' should be newly produced on the side of the newly added Web service 5', and the reading destination therefor (URL or such) should be designated in all of the client hosts 100A through 100E.

Figure 9A:
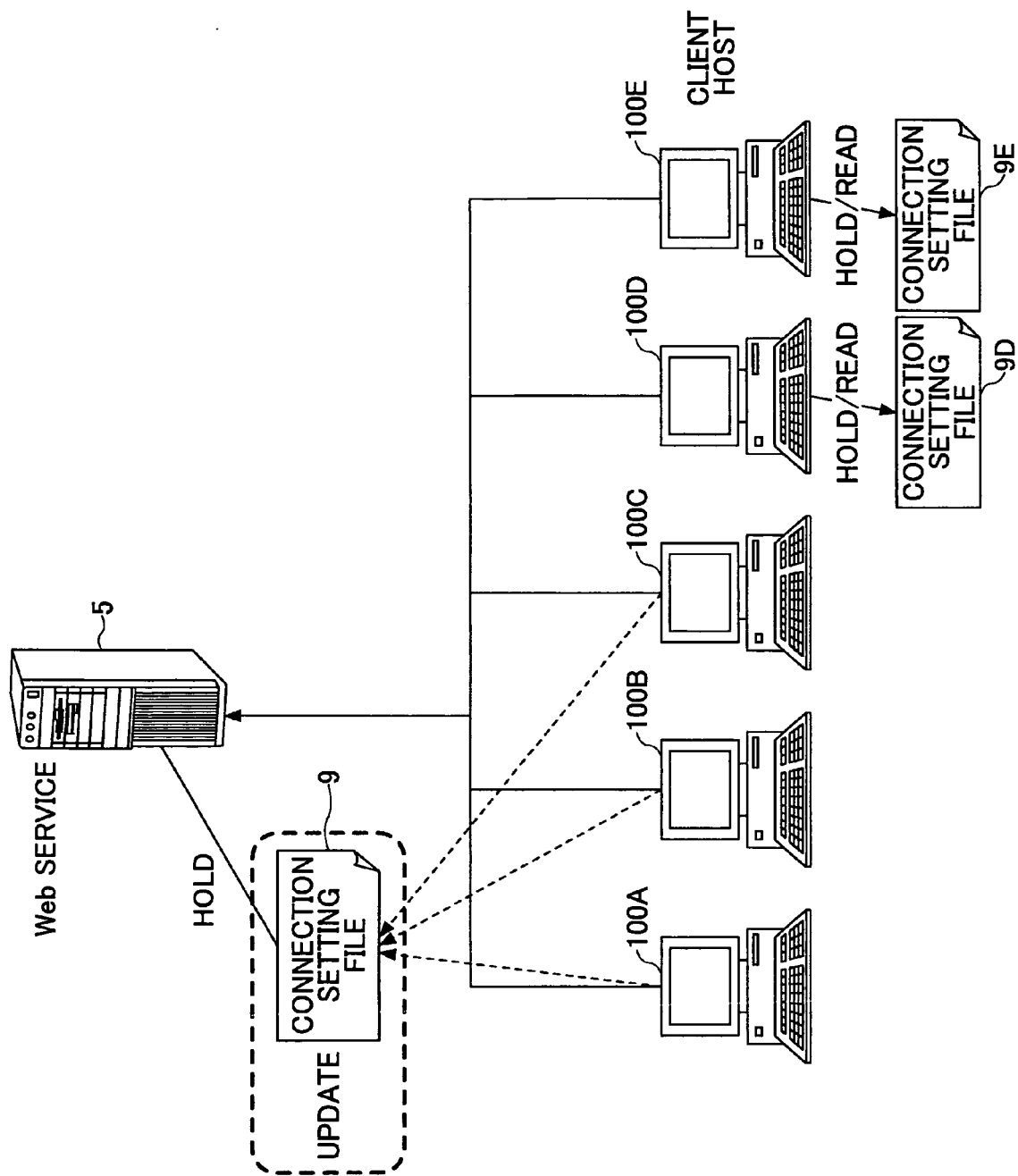
FIG. 9A shows one example in a case where the connection setting file is managed by both the sides of the client and the server.
Figure 9B:
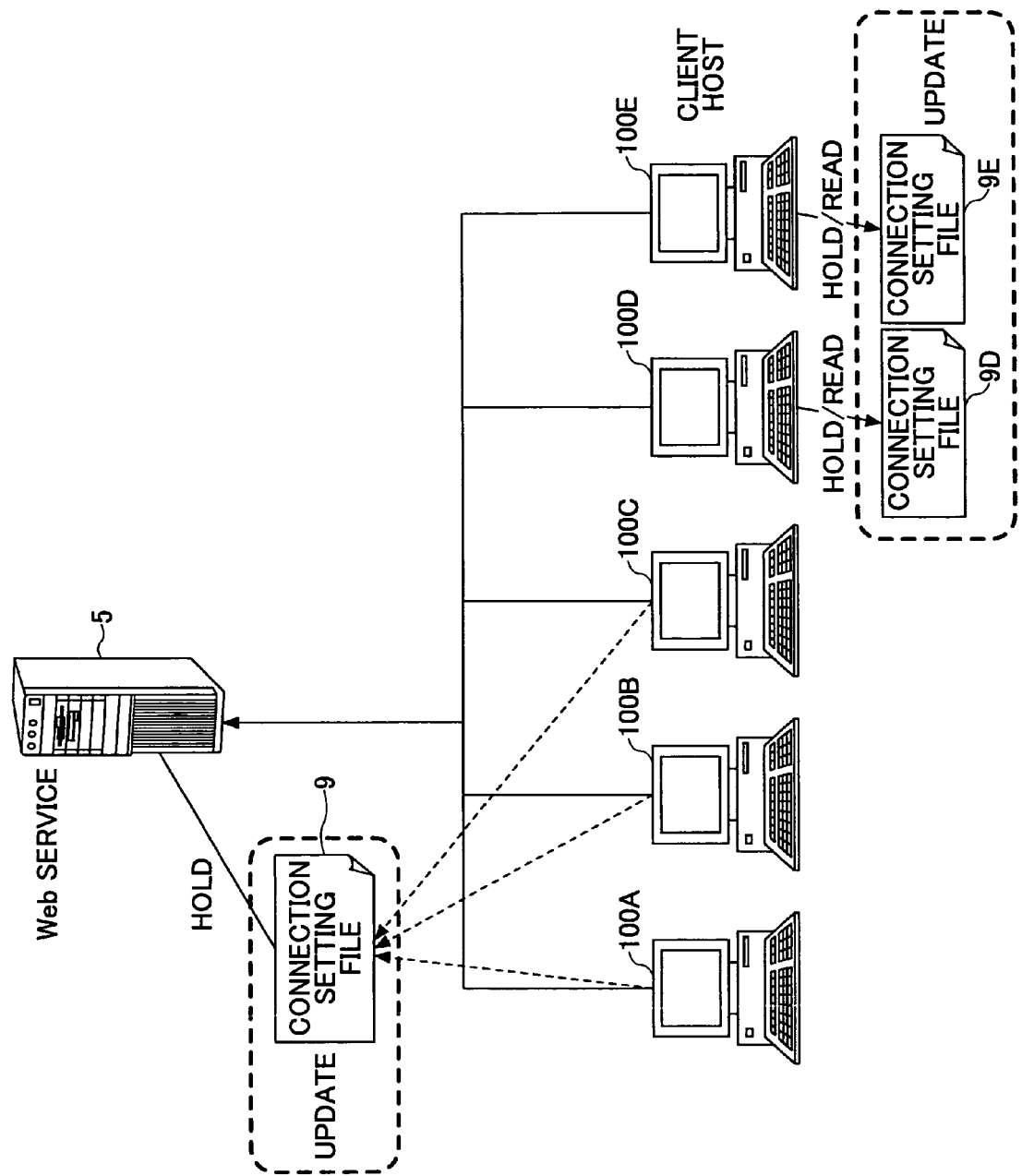
FIG. 9B shows one example of setting change in the case where the connection setting file is managed by both the sides of the client and the server.
Figure 9C:
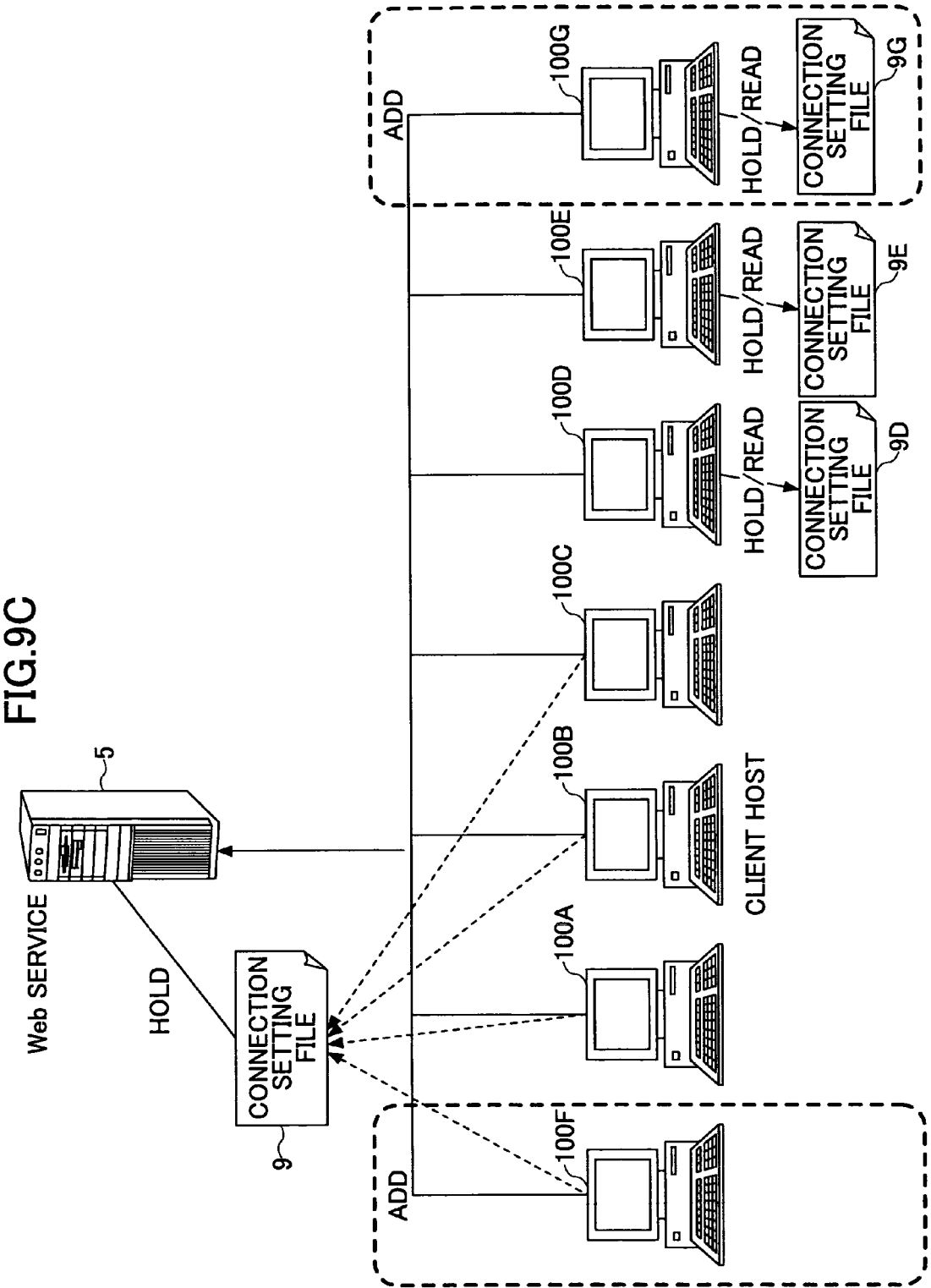
FIG. 9C shows one example of adding a client in the case where the connection setting file is managed by both the sides of the client and the server.
Figure 9D:
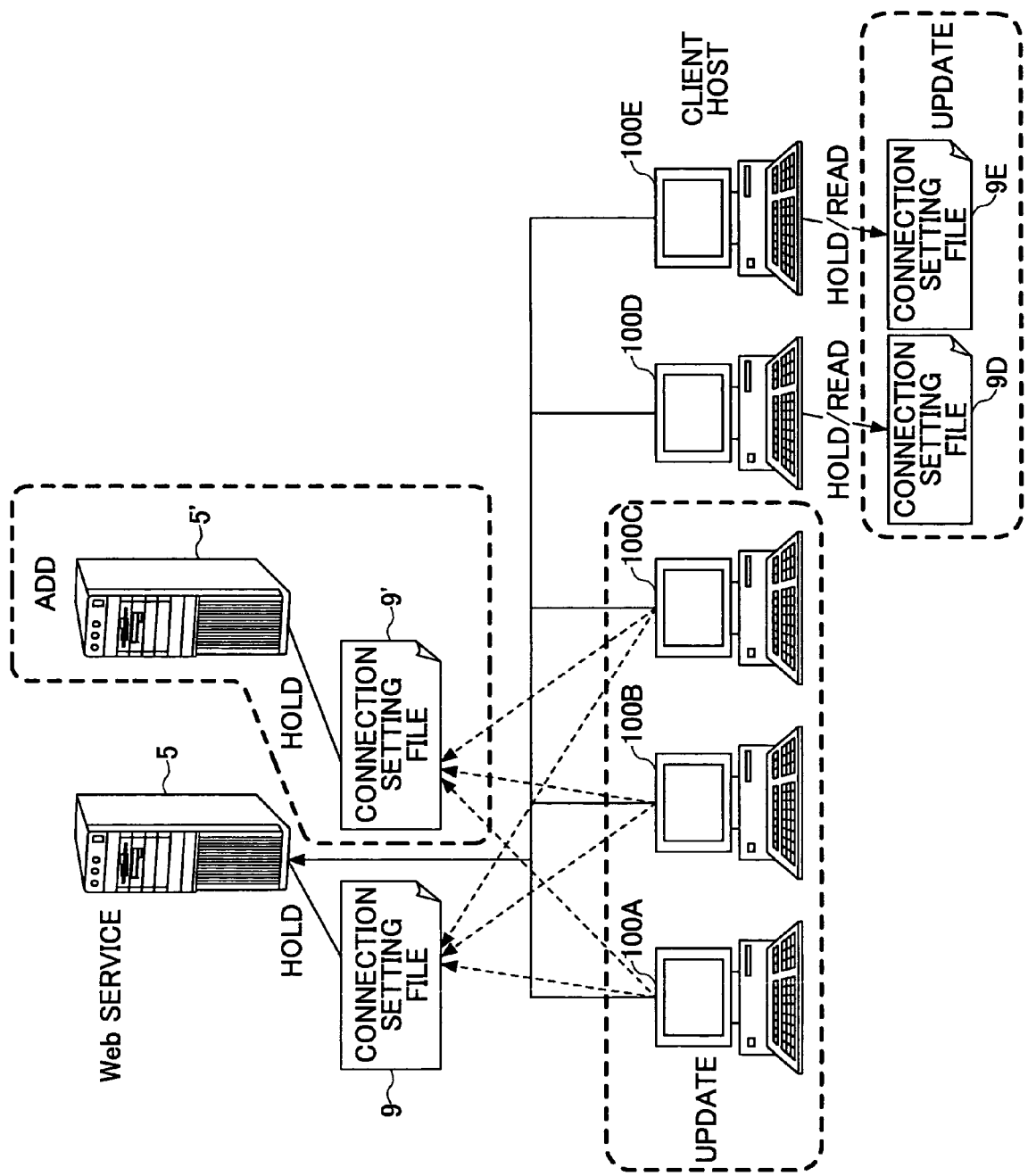
FIG. 9D shows one example of adding a Web service in the case where the connection setting file is managed by both the sides of the client and the server.

FIG. 9A shows an example in which the connection setting files are managed by both the server side and the client side. In this case, the connection setting file 9 is disposed on the side of the Web service 5, which is read by the group of the client hosts 100A through 100C with the use of the corresponding URL or such, and also, the connection setting files 9D and 9E are disposed in the other group of the client hosts 100D and 100E to be held and read. In this case, it is possible that, for such a group of clients, which should be managed in a unified manner, the setting therefor can be provided at a common single location, while, for such a group of clients, which should be managed separately one by one, settings therefor can be provided separately one by one accordingly. However, in this case, the condition setting files are scattered. This configuration is located at an intermediate position between the above-described two configurations, i.e., one of FIGS. 7A through 7D and the other of FIGS. 8A through 8D. FIG. 9B shows an example of a change in the condition. When the condition is changed, the connection setting file 9 on the side of the Web service 5 should be updated accordingly, and also, the connection setting files 9D and 9E in the client hosts 100D and 100E should be updated accordingly. FIG. 9C shows an example of adding a client. When the client host 100F is added, the reading destination (URL or such) for the connection setting file 9 should be designated also in the newly added client host 100F. When the client host G is added, the connection setting file 9G is newly produced in the newly added client host 100G. FIG. 9D shows an example of adding a Web service 5'. When the Web service 5' is thus added, the connection setting file 9' should be produced on the side of the newly added Web service 5', the reading destination therefor (URL or such) should be designated in the client hosts 100A through 100C, and also, the connection setting files 9D and 9E of the client hosts 100D and 100E should be updated accordingly.

Figure 10B:
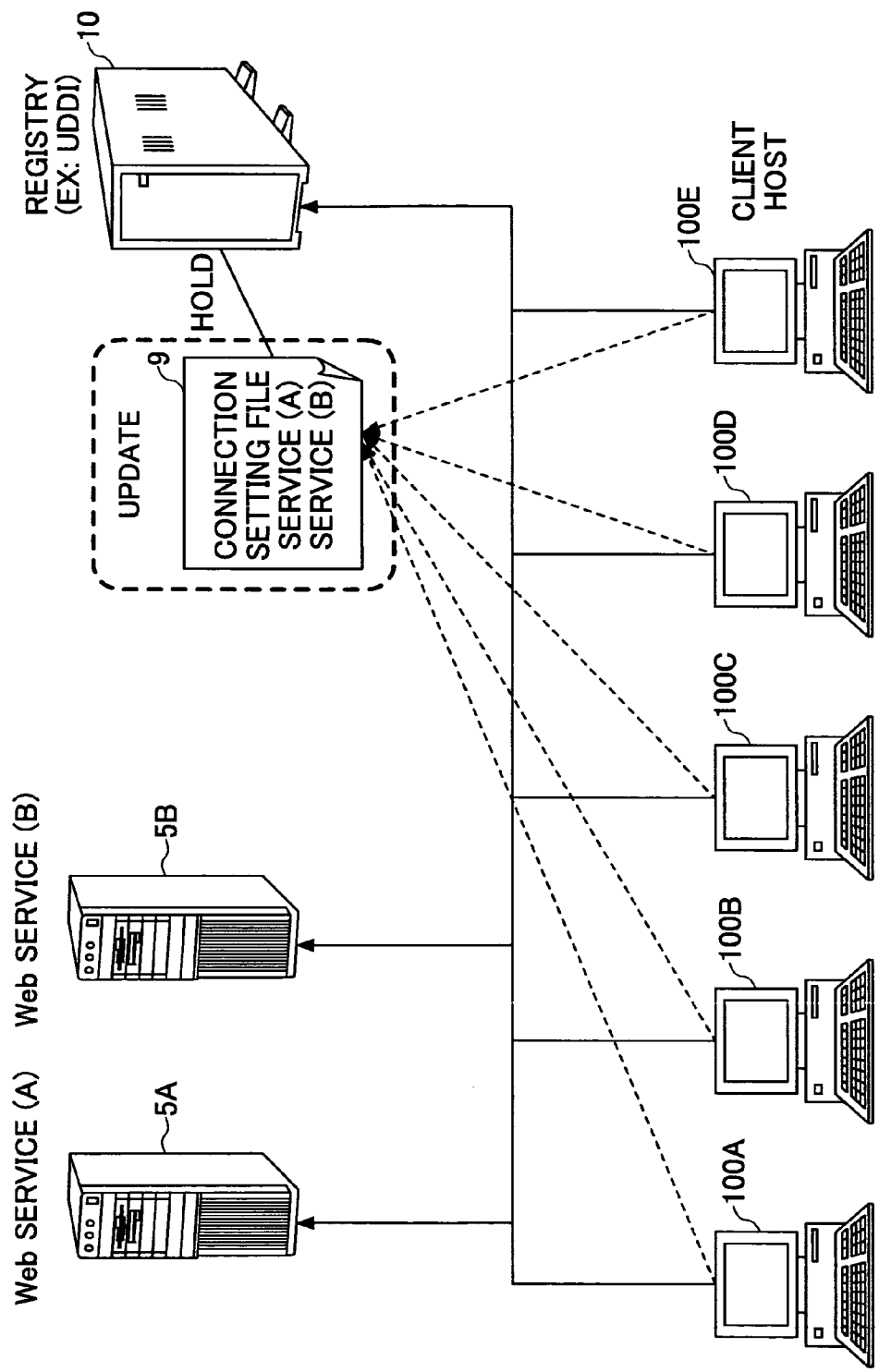
FIG. 10B shows one example of setting change in the case where the connection setting file is managed by the side of the registry host.
Figure 10D:
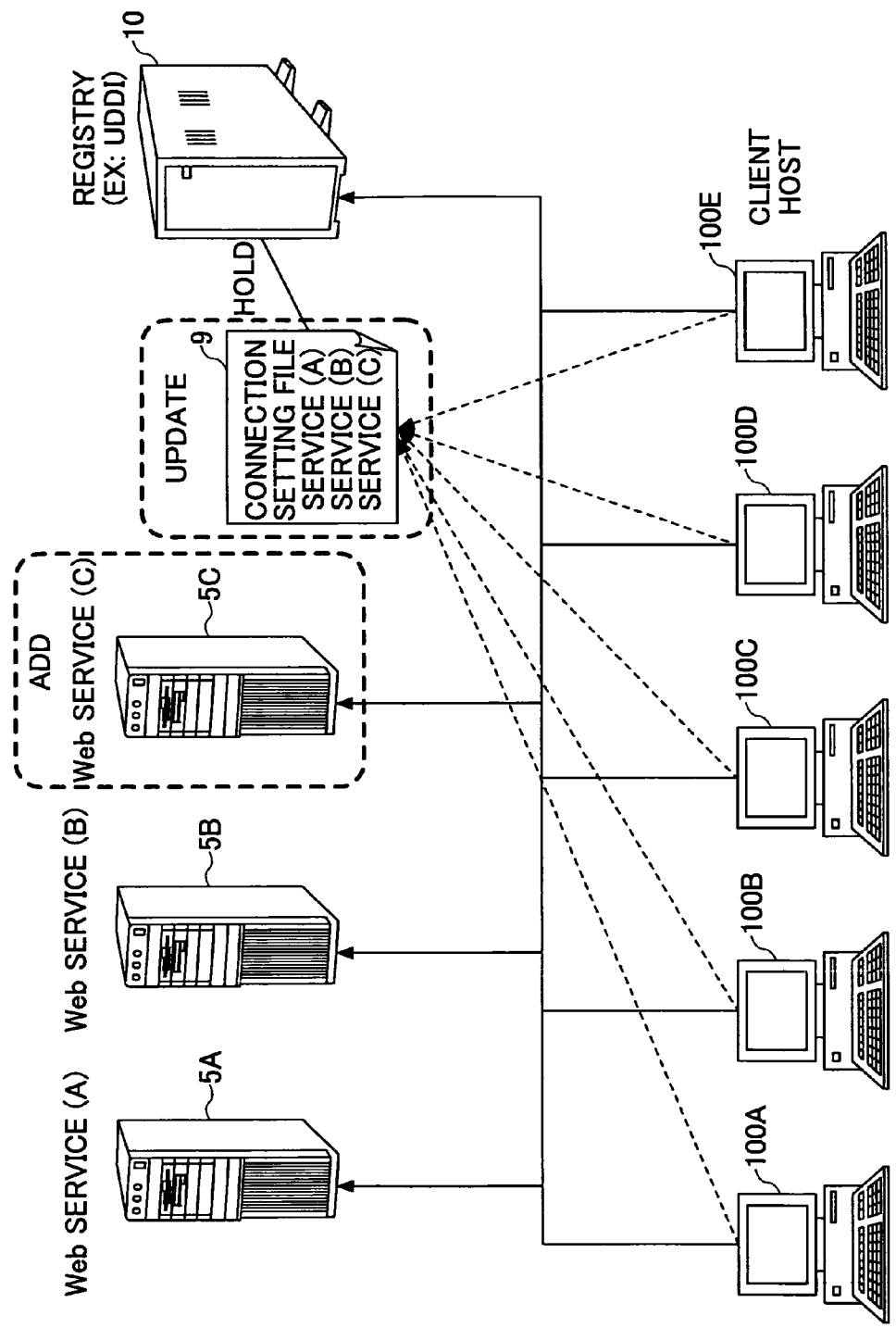
FIG. 10D shows one example of adding a Web service in the case where the connection setting file is managed by the side of the registry host.

FIG. 10A shows an example in which the condition setting file is managed by a registry host side. In this case, the connection setting file 9 is disposed on the side of the registry host 10 such as UDDI (Universal Description and Integration), and is read by the client hosts 100A though 100E with the use of the corresponding URL or such. In this case, at the same time at which the client hosts 100A through 100E search for a Web service, the connection way optimum to the environment can be selected dynamically, and also, the condition setting file 9 can be concentrated in the registry 10. However, it is necessary to establish the registry 10 when this configuration is introduced. This configuration is advantageous for a case where the number of the clients is large, an increasing rate thereof is large, the number of Web services is large and an increasing rate thereof is large. FIG. 10B shows an example of a change in the condition. When the condition is changed, merely the connection setting file 9 on the side of the registry 10 should be updated accordingly. FIG. 10C shows an example of adding a client. When the client host 100F is added, the accessing destination for the connection setting file 9 (URL or such) should be designated also in the newly added client host 100F. FIG. 10D shows an example of adding a Web service. When the Web service 5C is added, the connection setting file 9 on the side of the registry 10 should be updated accordingly.

Figure 11A:
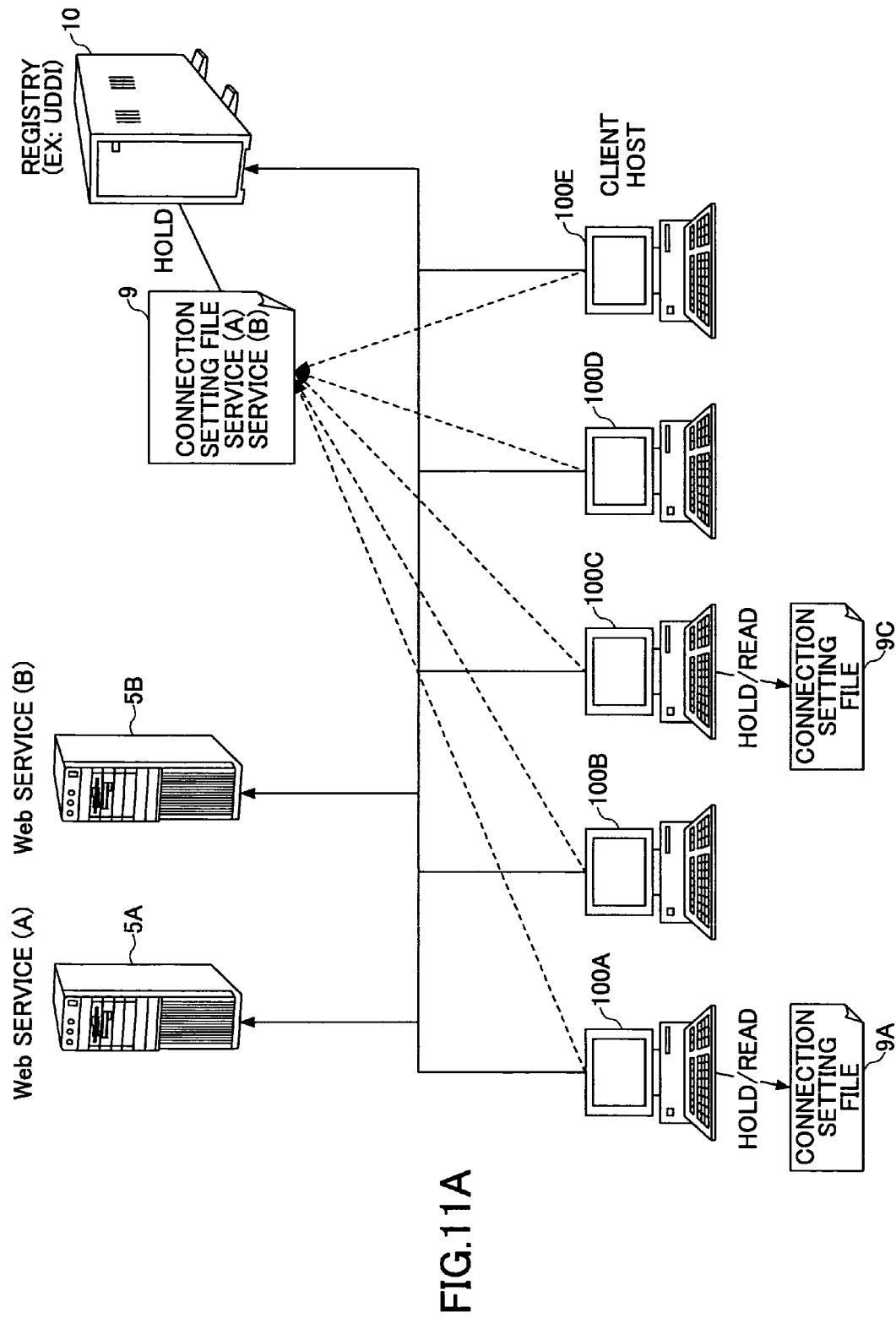
FIG. 11A shows one example of a case where the connection setting file is managed by both the sides of the registry host and the client.
Figure 11B:
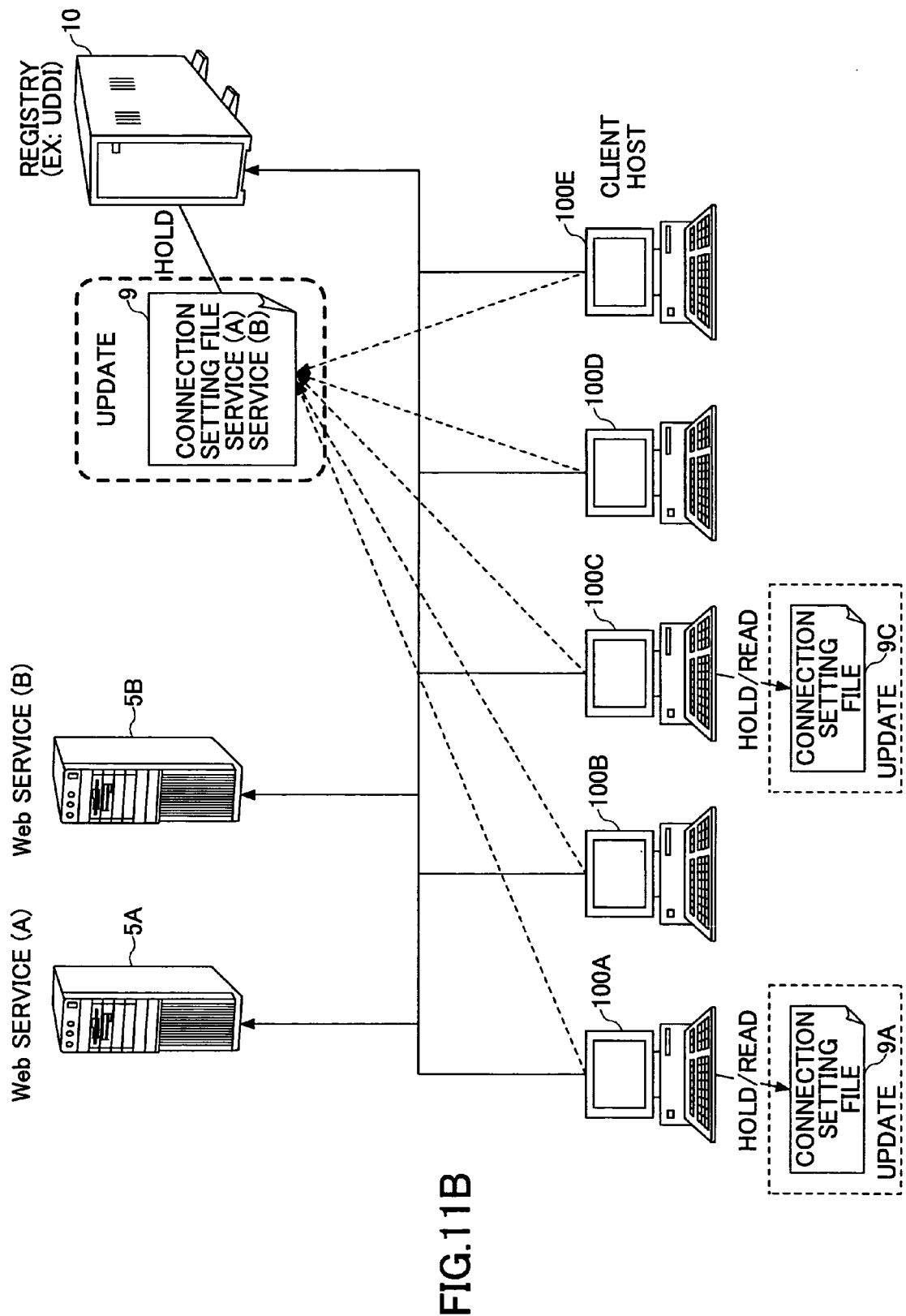
FIG. 11B shows one example of setting change in the case where the connection setting file is managed by both the sides of the registry host and the client.
Figure 11C:
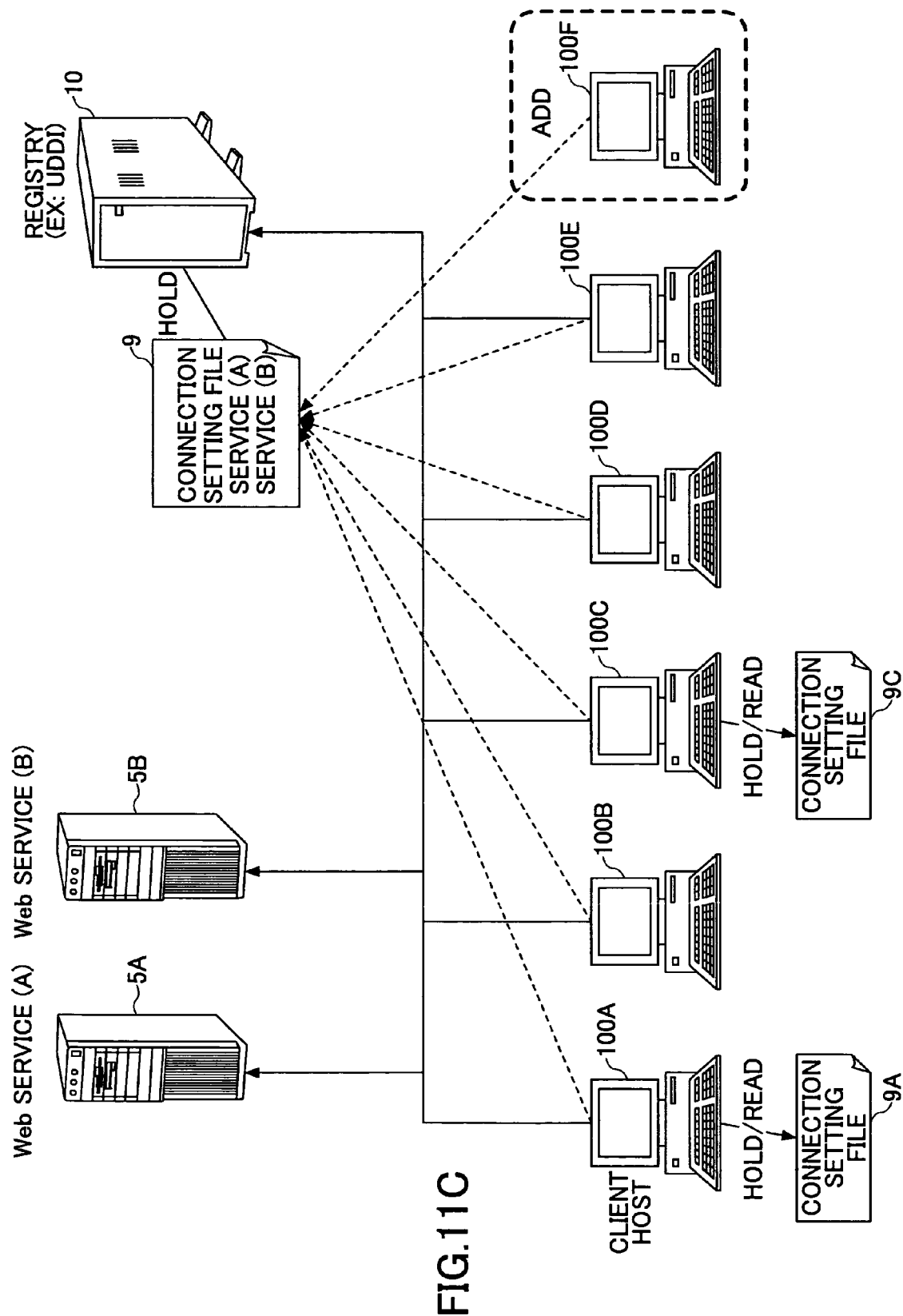
FIG. 11C shows one example of adding a client in the case where the connection setting file is managed by both the sides of the registry host and the client.
Figure 11D:
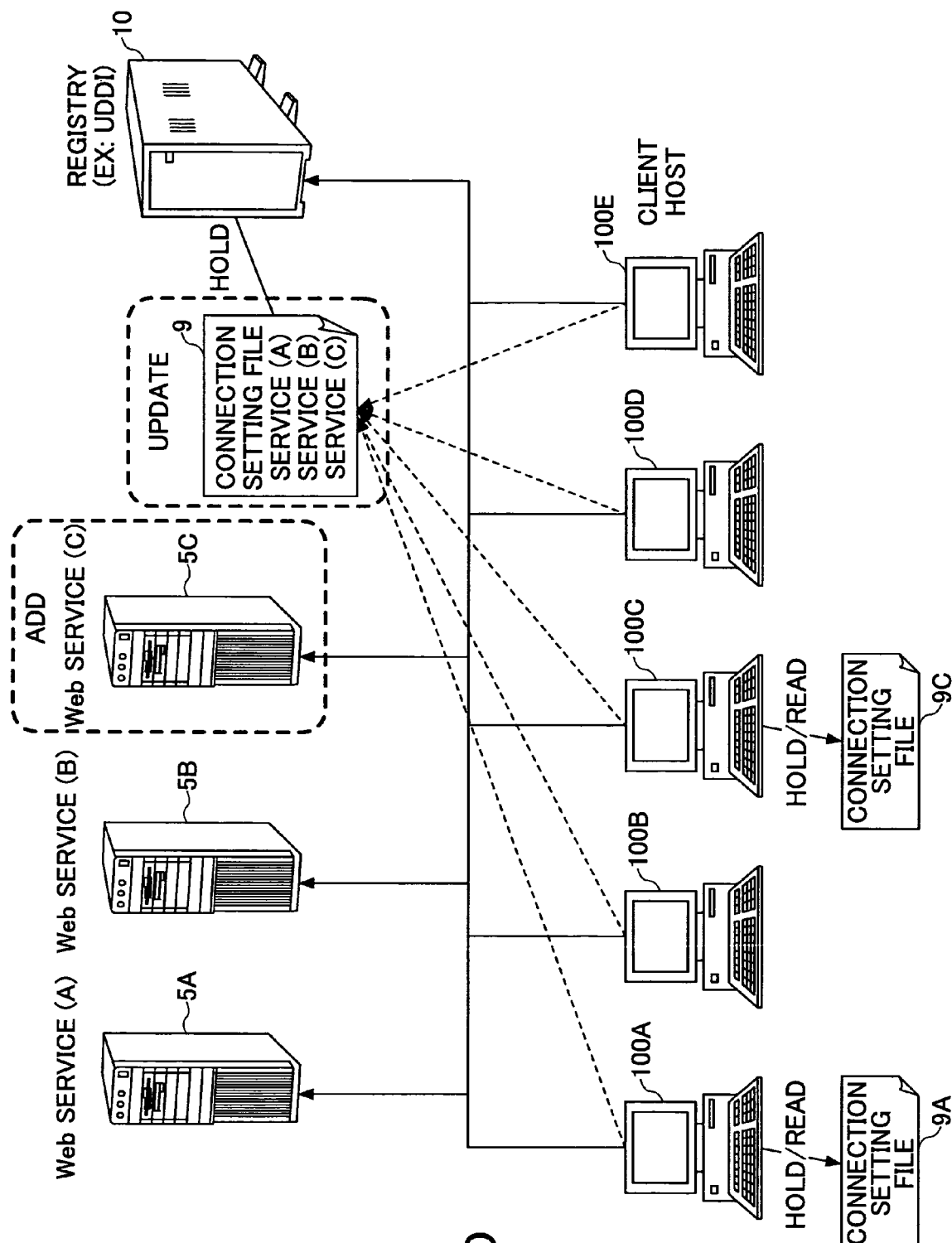
FIG. 11D shows one example of adding a Web service in the case where the connection setting file is managed by both the sides of the registry host and the client.

FIG. 11A shows an example in which the connection setting files are managed by both the registry host side and the client side. In this case, the connection setting file 9 is disposed on the side of the registry host 10 such as UDDI, which is read by the group of the client hosts 100A through 100E with the use of the corresponding URL or such, and also, the condition setting files 9A and 9C are disposed in some client hosts 100A and 100C to be held and read. In this case, in addition to the above-mentioned advantages of the case of FIGS. 10A through 10D, the side of the client hosts can have a unique extension. However, maintenance of the side of the client hosts is required. FIG. 11B shows an example of a change in the condition. When the connection setting file 9 on the side of the registry 10 is updated, the basic setting can be reflected on all the client hosts. As to the client hosts 100A, 100C having the unique settings, the change is made separately. FIG. 11C shows an example of adding a client. When the client host 100F is added, the reading destination (URL or such) for the connection setting file 9 should be designated also in the newly added client host 100F. FIG. 11D shows an example of adding a Web service. When the Web service 5C is thus added, the connection setting file 9 on the side of the registry 10 should be updated accordingly.

FIGS. 12 through 16 show an example of a detailed configuration of the Web service connecting mechanism. FIG. 12 shows an example in which the connection setting files 9 are on the side of the client hosts 100; and FIG. 13 and FIG. 14 show examples in which the connection setting file 9 is on the side of the service host 500.

In FIG. 12, the automatic connection switching module 8 includes a common interface part 801 receiving a connection request from the common interface execution code 11; a connection managing part 802 controlling connection with the side of the Web service 5 with the use of any one of the Java execution code 81, the JMS execution code 82, the EJB execution code 83 and the SOAP execution code 84; a connection selecting determination part 803 determining, in response to the request from the connection managing part 802, binding to actually use based on the set contents (selection condition) of the connection setting file 9 and the environment information; a setting file reading/analyzing part 804 reading and analyzing, in response to the request from the connection selecting determination part 803, the set contents from the connection setting file 9; a client environment information obtaining part 805 obtaining the environment information on the side of the client; and a server environment information obtaining part 806 obtaining the server environment information from a server environment information obtaining agent 807 provided on the side of the service host 500. The client environment information obtaining part 805 and the server environment information obtaining part 806 may be regarded as a unit, i.e., an environment information obtaining part. Further, in the Java execution code 81, the JMS execution code 82, the EJB execution code 83 and the SOAP execution code 84, a Java calling part 811, a JMS calling part 821, an EJB calling part 831 and a SOAP calling part 841, carrying out connection to the side of the Web service 5, are provided, respectively. The other configuration is the same as that shown in FIG. 2.

In the example of FIG. 13, the connection setting file 9 is provided on the side of the service host 500, and the setting file reading/analyzing part 804 of the automatic connection switching module 8 reads the contents of the connection file 9 by means of the network.

In the example of FIG. 14, the setting file reading/analyzing part 804 is provided on the side of the service host 500, and the connection selecting determination part 803 reads the contents of the connection setting file 9 from the setting file reading/analyzing part 804 by means of the network.

Figure 15:
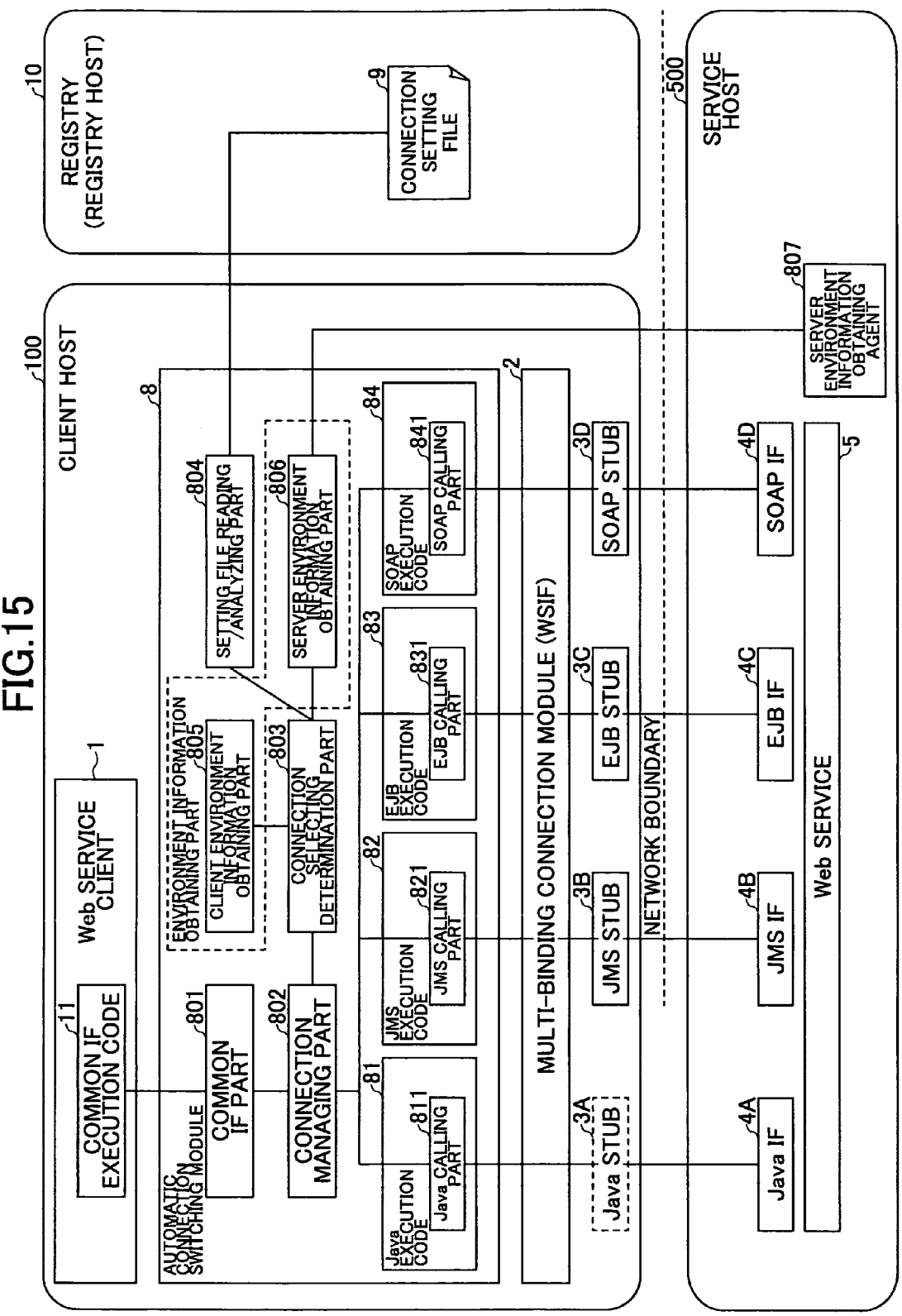

In the example of FIG. 15, the connection setting file 9 is provided on the side of the registry 10 and the setting file reading/analyzing part 804 of the automatic connection switching module 8 reads the contents of the connection file 9 from the registry 10.

Figure 16:
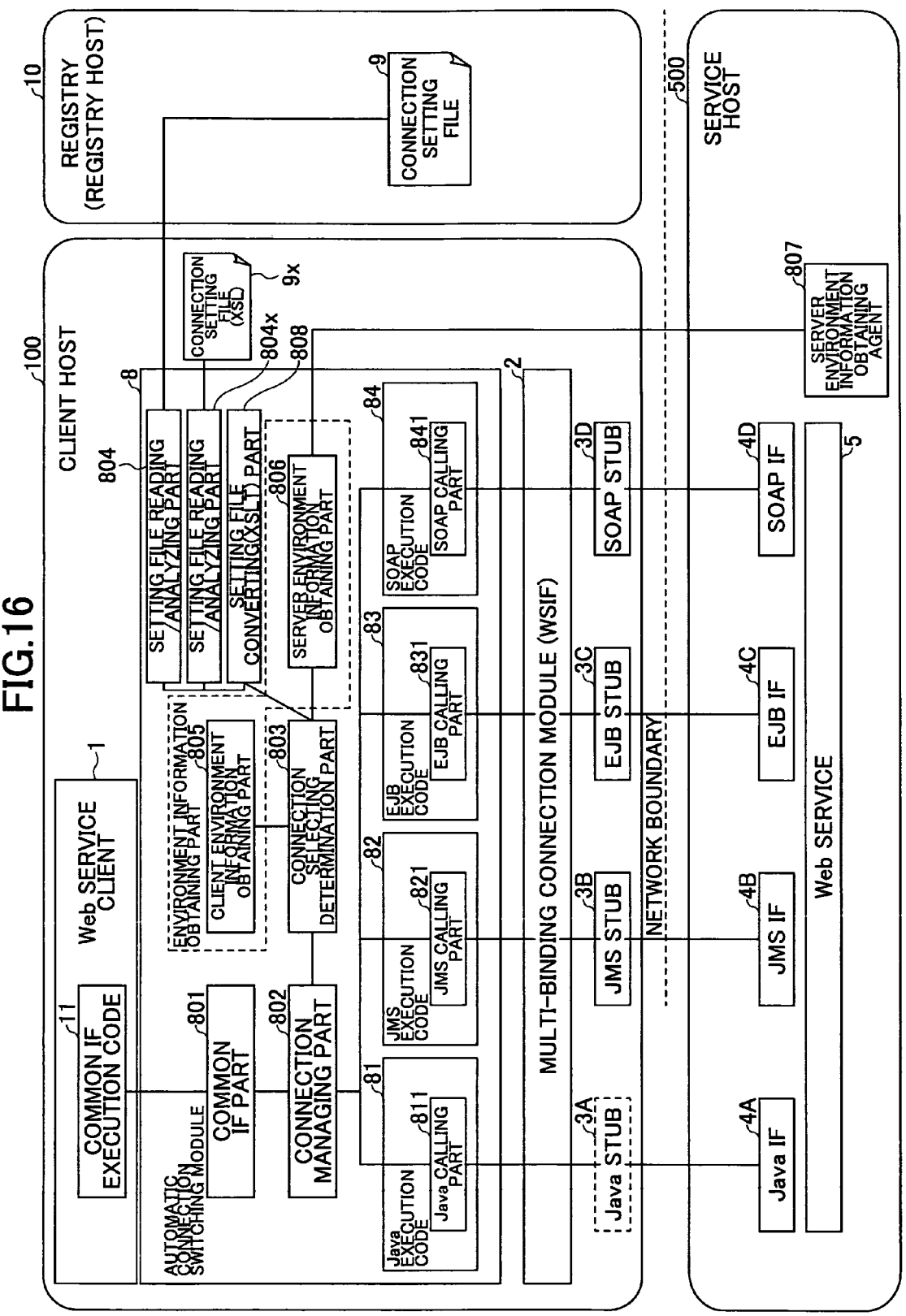
Figure 17:
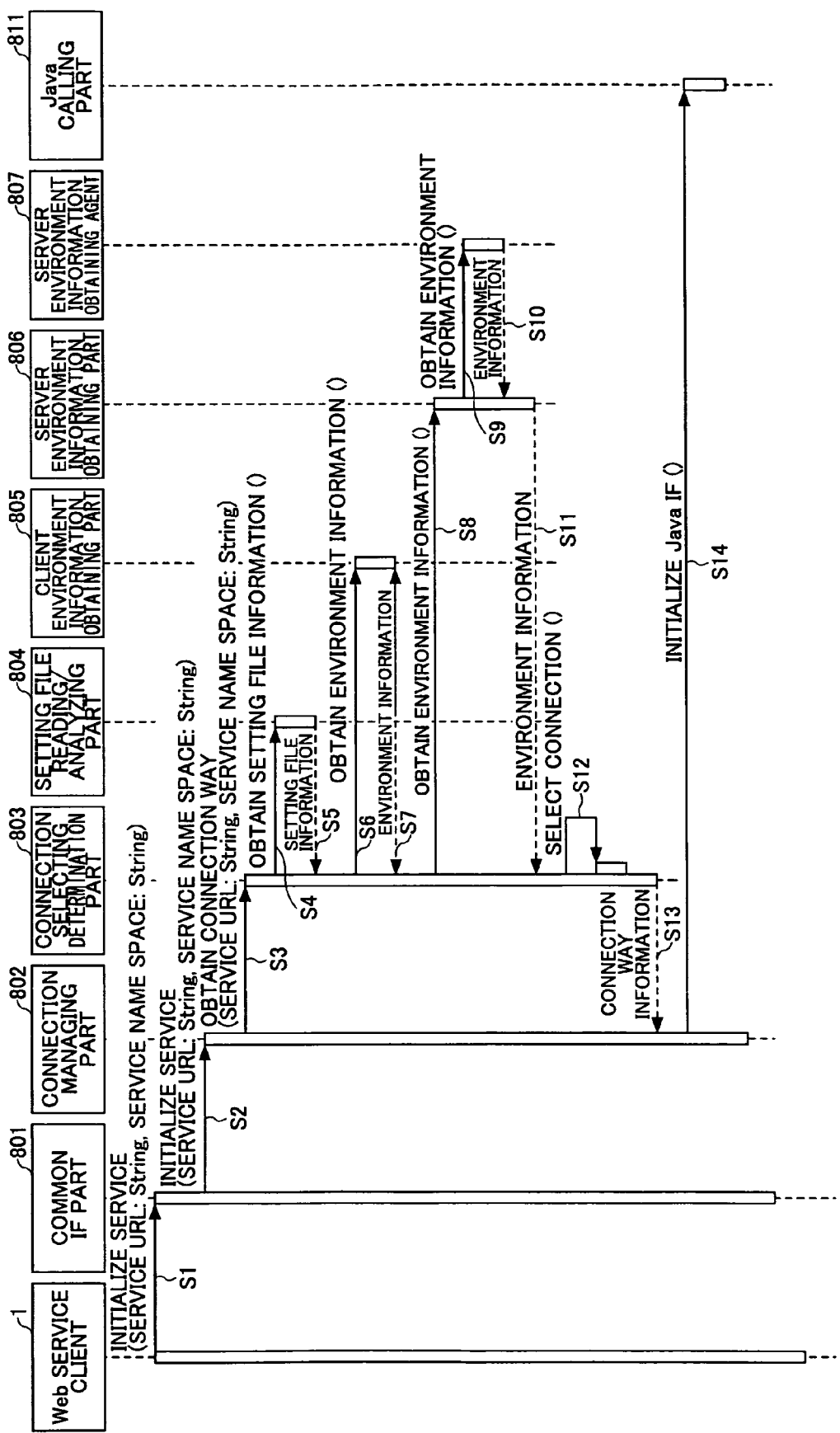
FIG. 17 shows an example of conversion by XSL.
Figure 18:
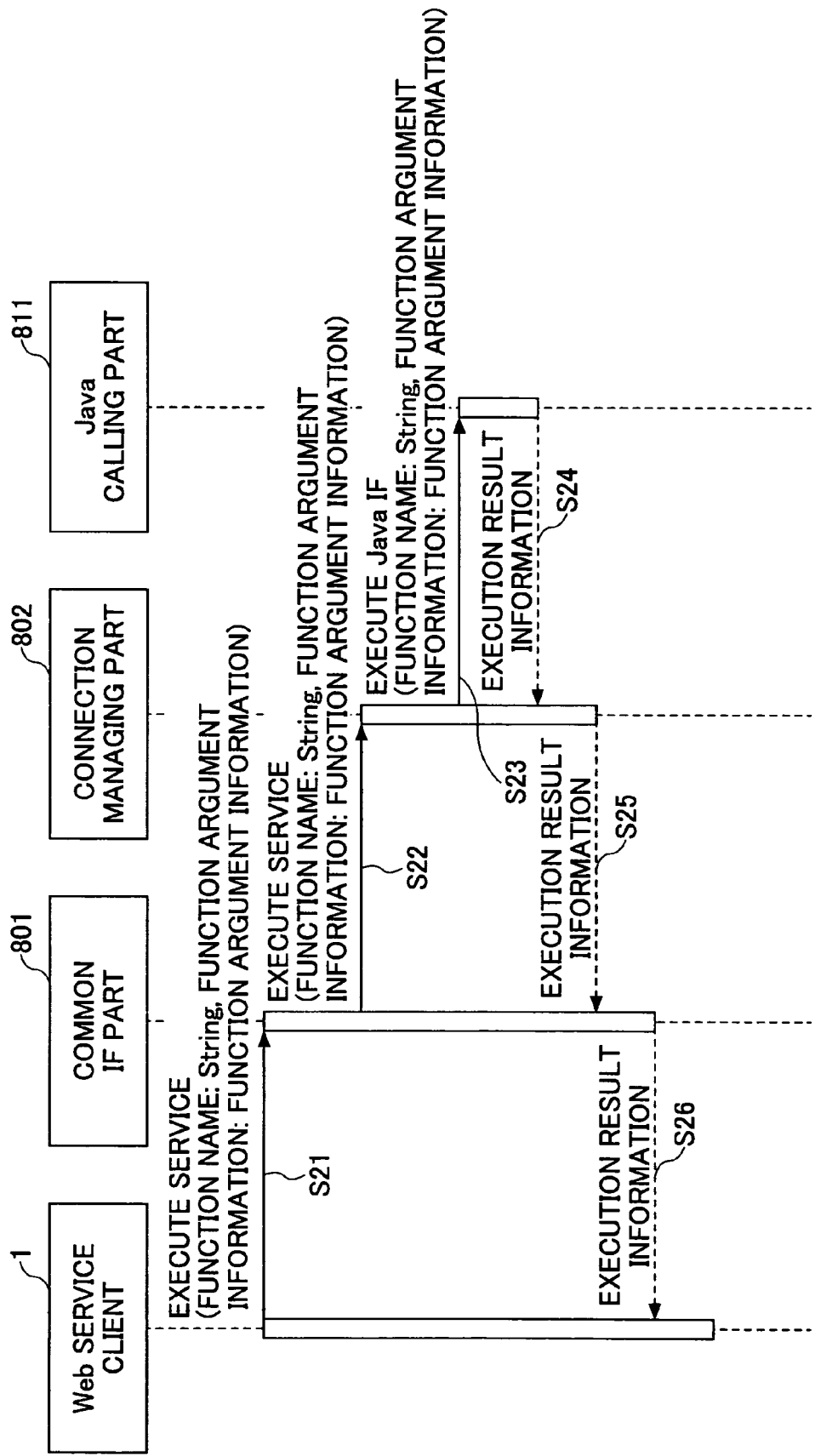
FIG. 18A shows one example of a sequence of initialization for when initialization and service execution are separated.
FIG. 18B shows one example of a sequence of service execution for when initialization and service execution are separated.

In the example of FIG. 16, the connection setting file 9 is provided on the side of the registry 10, and the setting file reading/analyzing part 804 of the automatic connection switching module 8 reads the contents of the connection file 9 from the registry 10. Also, on the side of the client host 100, uniquely extended connection setting file 9x described in XSL (XML Stylesheet Language) is provided, which is read by the connection setting file reading/analyzing part 804x and is converted according to XSLT (XML Stylesheet Language Transformation) or such by a setting file converting part 808. FIG. 17 shows an example of conversion in XSL, (a) shows an example of the connection setting file 9x on the side of the client host 100 described in XSL; and (b) shows the connection setting file after the conversion (XSLT). In this example, as shown, the condition of JavaBinding is changed, and also, SOAPBindingis deleted.

FIGS. 18A through 20 show sequence diagrams for operation of the Web service connecting mechanism shown in FIGS. 12 through 14.

FIG. 18A shows a sequence example for initialization in a case where initialization and service execution are separated. In this example, a processing time can be reduced when, before service execution, service initialization is carried out only once, and the service is executed a plurality of times. In FIG. 18A, when a service initialization request accompanied by the service URL and the service name space is sent from the Web service client 1 to the common interface part 801 (Step S1), the common interface part 801 transfers this request to the connection managing part 802 (Step S2), the connection managing part 802 then requests a connection way from the connection selecting determination part 803 (Step S3). In response thereto, the connection selecting determination part 803 requests from the setting file reading/analyzing part 804 connection setting file information (Step S4), the setting file reading/analyzing part 804 reads the connection setting file, analyzes it, and returns the thus-obtained setting information to the connection selecting determination part 803 (Step S5).

Next, the connection selecting determination part 803 requests from the client environment information obtaining part 805 client environment information (Step S6), the client environment information obtain part 805 collects the client environment information, and restores the same to the connection selecting determination part 803 (Step S7). Next, the connection selecting determination part 803 requests from the server environment information obtaining part 806 server environment information (Step S8), the server environment information obtaining part 806 obtains the server environment information from the server environment information obtaining agent 807 (Steps S9 and S10), and returns the same to the connection selecting determination part 803 (Step S11). Then, the connection selecting determination part 803 selects the connection way based on the setting condition of the connection setting file, the client environment information and the server environment information (Step S12), and informs the connection managing part 802 of the thus-selected connection way (Step S13). There, it is assumed that Java has been selected, for example. Then, the connection managing part 802 requests interface initialization of the Java calling part 811 (Step S14), and completes the initialization.

FIG. 18B shows an example of an execution sequence in a case where the initialization and the service execution are separated. It is noted that, by means of the processing shown in FIG. 18A, the initialization of the Java interface has been carried out previously. In FIG. 18B, when the Web service client 1 sends a request for service execution, accompanied by the function name and the function argument information, to the common interface part 801 (Step S21), the common interface part 801 transfers this request to the connection managing part 802 (Step S22), the connection managing part 802 requests the execution of the Java calling part 811 (Step S23). In response thereto, the Java calling part 811 carries out the service execution, returns the execution result to the connection managing part 802 (Step S24), and the execution result is then returned to the Web service client 1 via the connection managing part 802 and the common interface part 801 (Steps S25 and S26).

Figure 19:
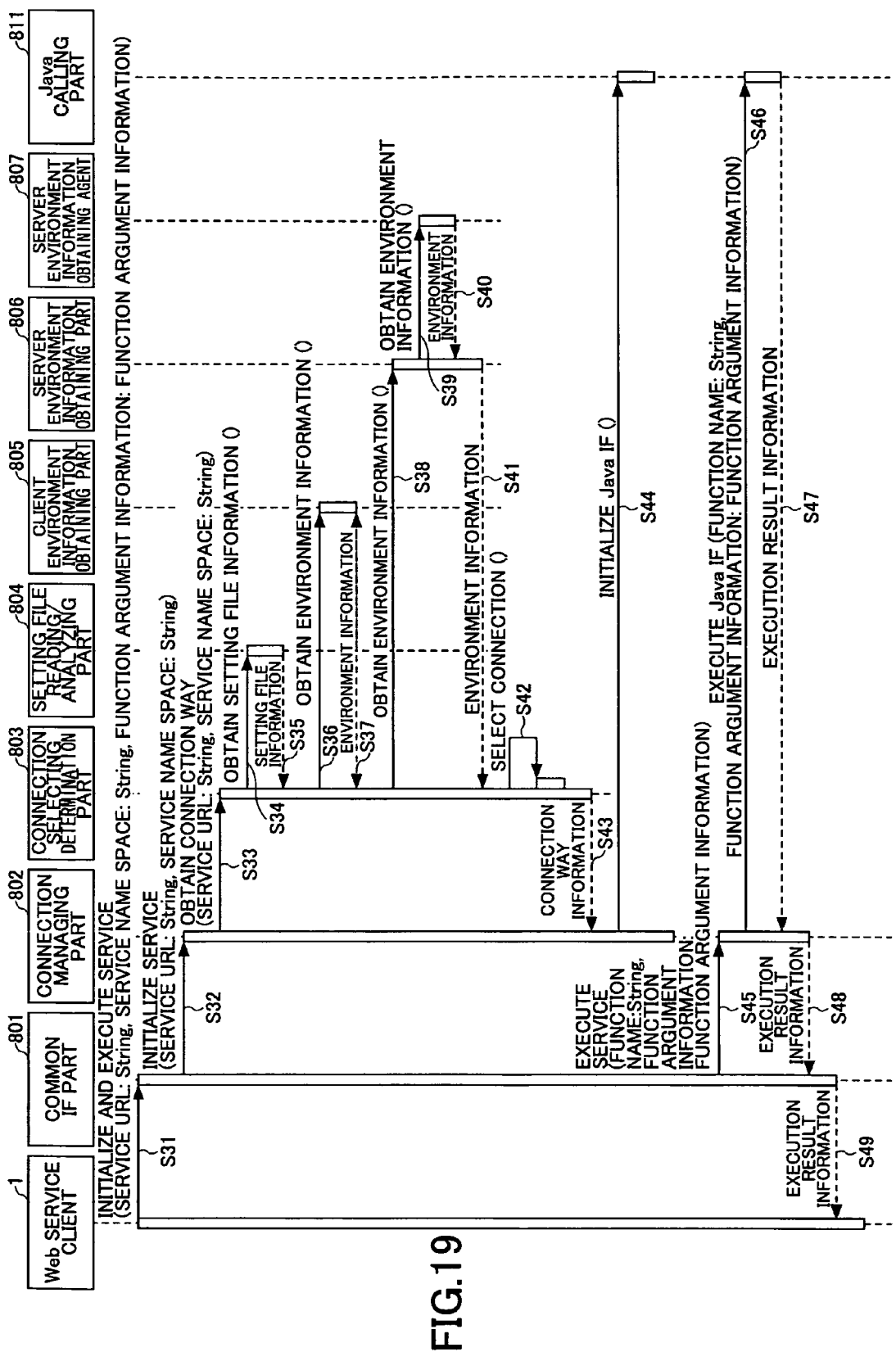
FIG. 19 shows one example of a sequence for when initialization and service execution are carried out by separate methods for when initialization and service execution are carried out at the same time.

FIG. 19 shows an example of a sequence in a case where the initialization and the service execution are carried out at the same time, and the initialization and the service execution are carried out by respective separate methods. In this example, service initialization is carried out each time when the service execution is carried out. In this case, since the client side uses only one function, the execution procedure can be simplified. In FIG. 19, when the Web service client 1 sends a request for service initialization accompanied by the service URL and the service name space and for the service execution, to the common interface part 801 (Step S31), the common interface part 801 sends a request for the service initialization accompanied by the service URL and the service name space to the connection managing part 802 (Step S32), and the connection managing part 802 requests connection way information from the connection selecting determination part 803 (Step S33). In response thereto, the connection selecting determination part 803 requests the connection setting file information from the setting file reading/analyzing part 804 (Step S34), the setting file reading/analyzing part 804 reads and analyzes the connection setting file, and returns the setting information to the connection selecting determination part 803 (Step S35).

Next, the connection selecting determination part 803 requests from the client environment information obtaining part 805, client environment information (Step S36), the client environment information obtaining part 805 then collects the client environment information, and returns the same to the connection selecting determination part 803 (Step S37). Next, the connection selecting determination part 803 requests from the server environment information obtaining part 806, server environment information (Step S38), the server environment information obtaining part 806 then obtains the server environment information from the server environment information obtaining agent 807 (Steps S39 and S40), and returns the same to the connection selecting determination part 803 (Step S41). Then, the connection selecting determination part 803 selects the connection way based on the setting condition of the connection setting file, the client environment information and the server environment information (Step S42), and informs the connection managing part 802 of the thus-selected connection way (Step S43). There, it is assumed that Java has been selected, for example. Then, the connection managing part 802 requests interface initialization of the Java calling part 811 (Step S44), and completes the initialization.

Next, the common interface part 801 sends a request for service execution accompanied by the function name and the function argument information to the connection managing part 802 (Step S45), and the connection managing part 802 then requests execution of the Java calling part 811 (Step S46). In response thereto, the Java calling part 811 carries out service execution, returns the execution result to the connection managing part 802 (Step S47), and the execution result is then returned to the Web service client 1 via the connection managing part 802 and the common interface part 801 (Steps S48 and S49).

Figure 20:
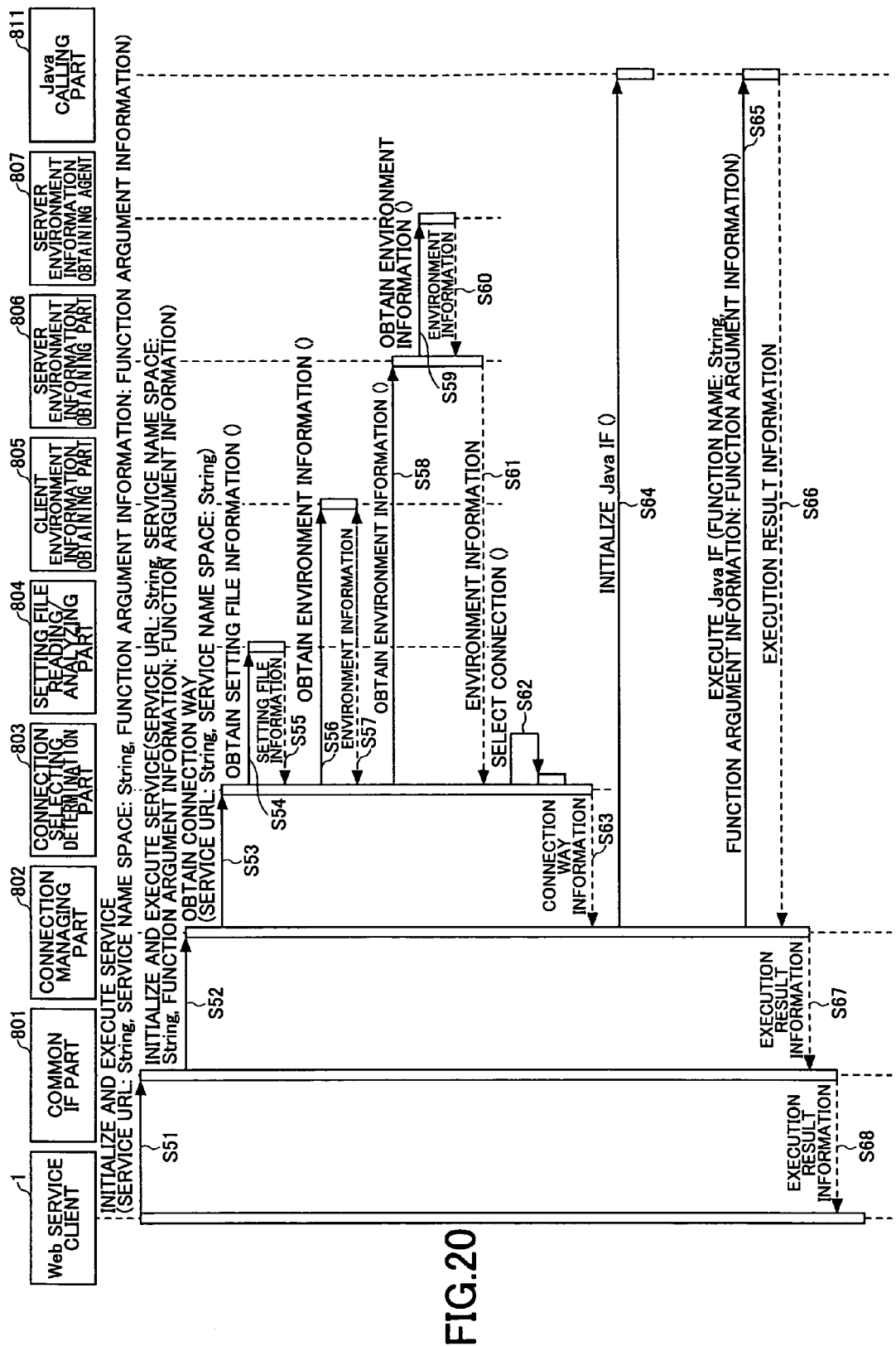
FIG. 20 shows one example of a sequence for when initialization and service execution are carried out by the same method for when initialization and service execution are carried out at the same time.

FIG. 20 shows an example of a sequence in a case where the initialization and the service execution are carried out at the same time, and the initialization and the service execution are carried out by a single method. In this example, the same as the example of FIG. 19, the service initialization is carried out each time when the service execution is carried out. In this case, since the client side uses only one function, the execution procedure can be simplified. In FIG. 20, when the Web service client 1 sends a request for service initialization accompanied by the service URL and the service name space and for service execution, to the common interface part 801 (Step S51), the common interface part 801 requests the service initialization accompanied by the service URL and the service name space of the connection managing part 802 (Step S52), and the connection managing part 802 then requests connection way information from the connection selecting determination part 803 (Step S53). In response thereto, the connection selecting determination part 803 requests the connection setting file information from the setting file reading/analyzing part 804 (Step S54), the setting file reading/analyzing part 804 then reads and analyzes the connection setting file, and returns the setting information to the connection selecting determination part 803 (Step S55).

Next, the connection selecting determination part 803 requests from the client environment information obtaining part 805, client environment information (Step S56), the client environment information obtaining part 805 then collects the client environment information, and returns the same to the connection selecting determination part 803 (Step S57). Next, the connection selecting determination part 803 requests from the server environment information obtaining part 806, server environment information (Step S58), the server environment information obtaining part 806 then obtains the server environment information from the server environment information obtaining agent 807 (Steps S59 and S60), and returns the same to the connection selecting determination part 803 (Step S61). Then, the connection selecting determination part 803 selects the connection way based on the setting condition of the connection setting file, the client environment information and the server environment information (Step S62), and informs the connection managing part 802 of the thus-selected connection way (Step S63). There, it is assumed that Java has been selected, for example. Then, the connection managing part 802 requests interface initialization of the Java calling part 811 (Step S64), and completes the initialization.

Next, the common interface part 801 sends a request for service execution accompanied by the function name and the function argument information to the Java calling part 811 (Step S65). In response thereto, the Java calling part 811 carries out the service execution, returns the execution result to the connection managing part 802 (Step S66), and the execution result is then returned to the Web service client 1 via the connection managing part 802 and the common interface part 801 (Steps S67 and S68).

Figure 21:
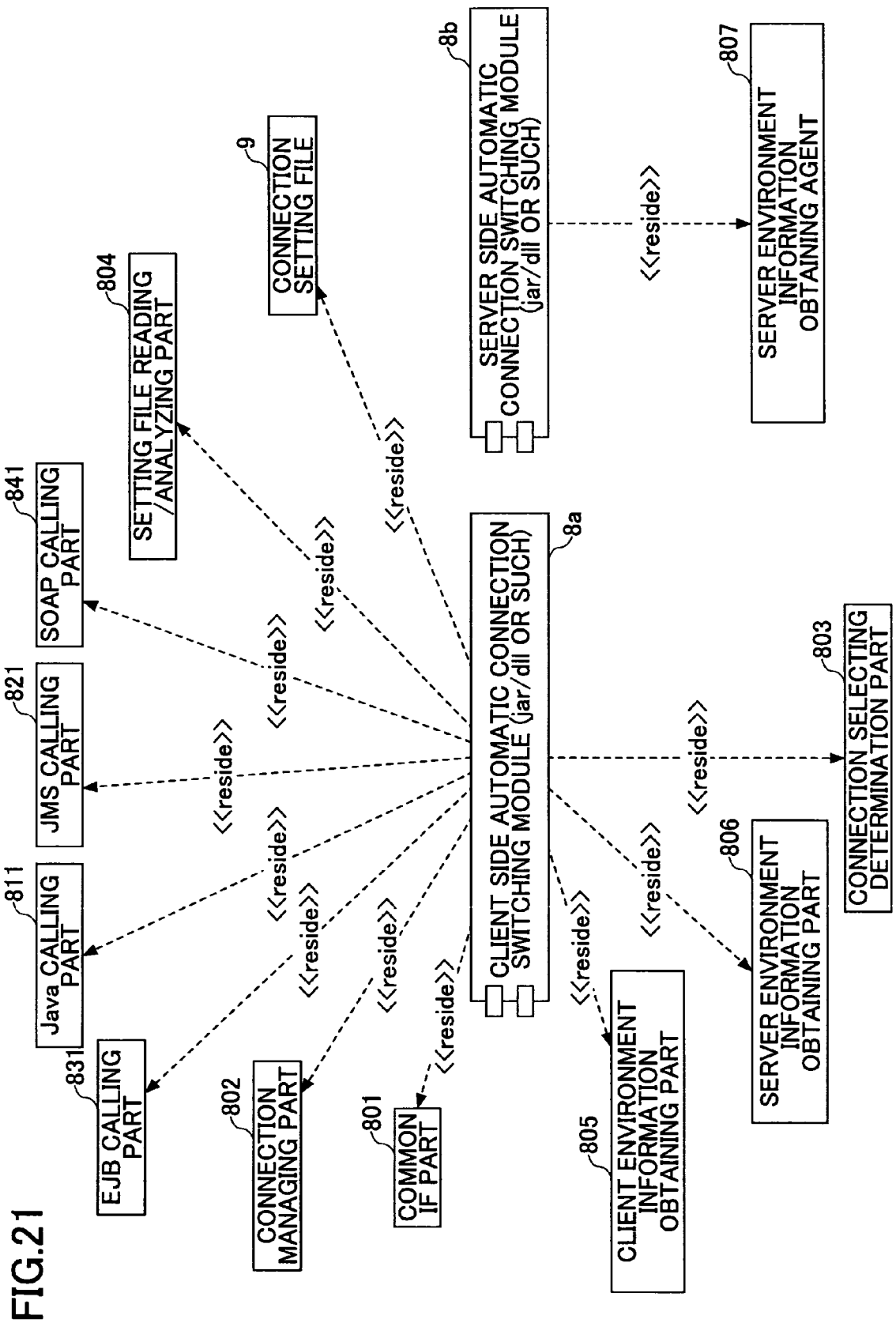
FIGS. 21 through 23 show components of an automatic connection switching module of a developing framework.
Figure 22:
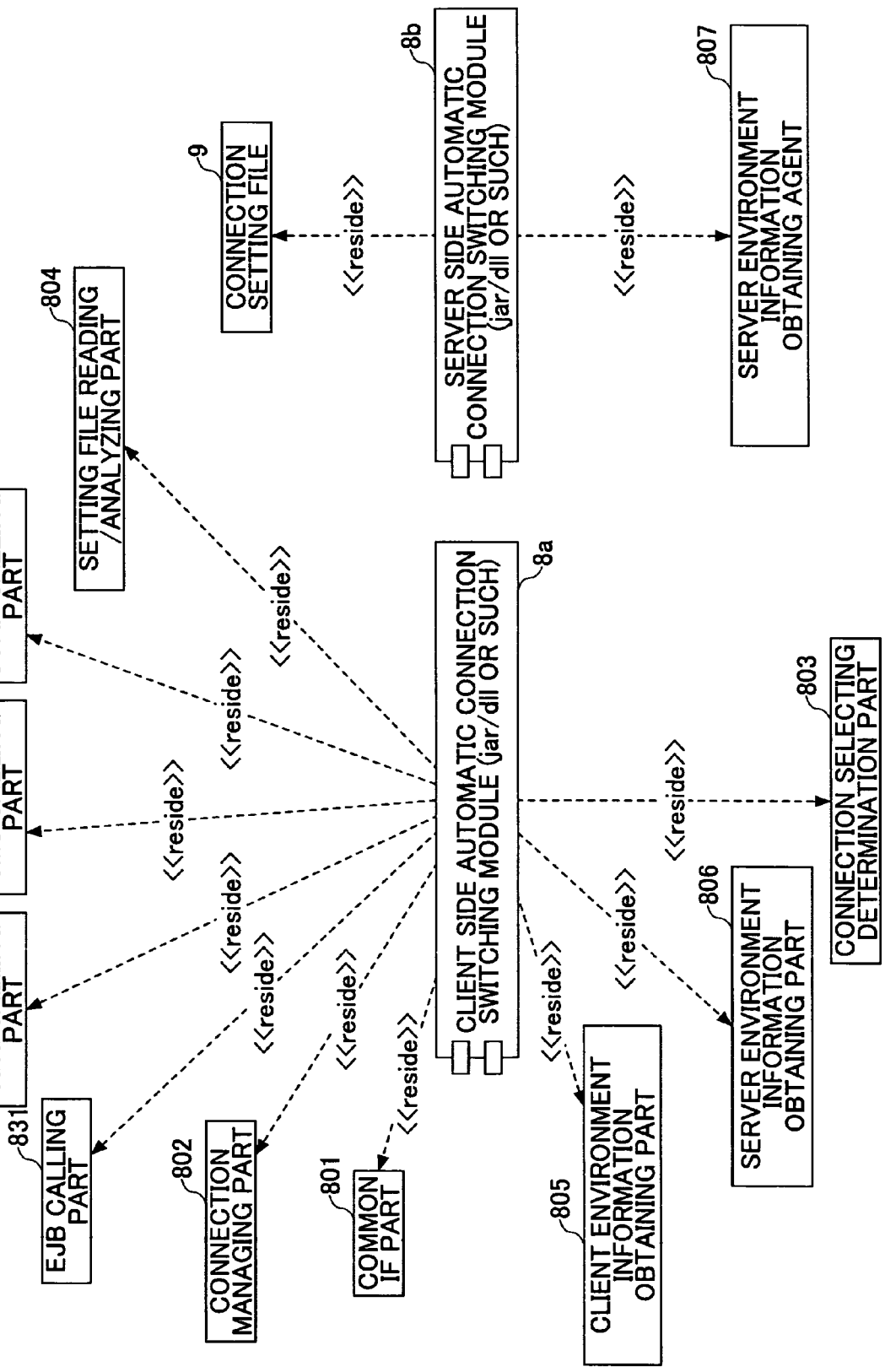
Figure 23:
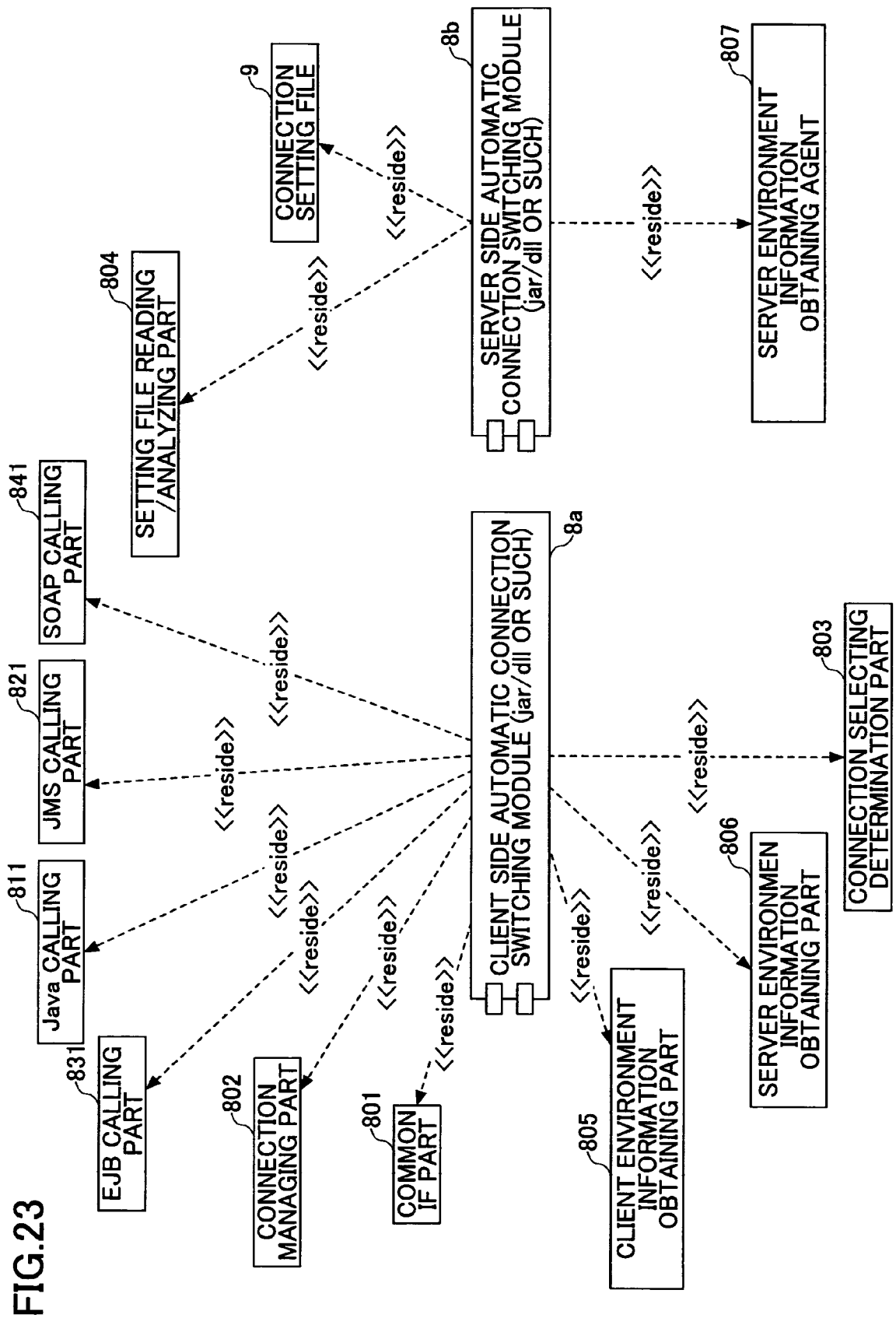

FIGS. 21 through 23 show component diagrams of the automatic connection switching module of the developing framework. FIG. 21 shows an example (corresponding to FIG. 12) in which the connection setting file 9 is located on the side of the client host 100, FIG. 22 shows an example (corresponding to FIG. 13) in which the connection stint file 9 is located on the side of the service host and the setting file reading/analyzing part 804 is located on the side of the client host 100, and FIG. 23 shows an example (corresponding to FIG. 14) in which the connection setting file 9 and the setting file reading/analyzing part 804 are located on the side of the service host.

In FIG. 21, the client side automatic connection switching module 8a and the server side automatic connection switching module 8b are provided in a form of files in a jar (Java Archive) form or a dll (Dynamic Link Library) form. In the client side automatic connection switching module 8a, as components, the common interface part 801, the connection managing part 802, the connection selecting determination part 803, the setting file reading/analyzing part 804, the client environment information obtaining part 805, the server environment information obtaining part 806, the Java calling part 811, the JMS calling part 821, the EJB calling part 831, the SOAP calling part 841 and the connection setting 9 are included. These are defined in the class definition as components. In the server side automatic connection switching module 8b, as components, the server environment information obtaining agent 807 is included, which is defined in the class definition as a component. In the case of FIG. 22, the server environment information obtaining agent 807 and the connection setting file 9 are included as components of the server side automatic connection switching module 8b. In the example of FIG. 23, the setting file reading/analyzing part 804, the server environment information obtaining part 807 and the connection setting file 9 are included as components of the server side automatic connection switching module 8b.

Figure 24:
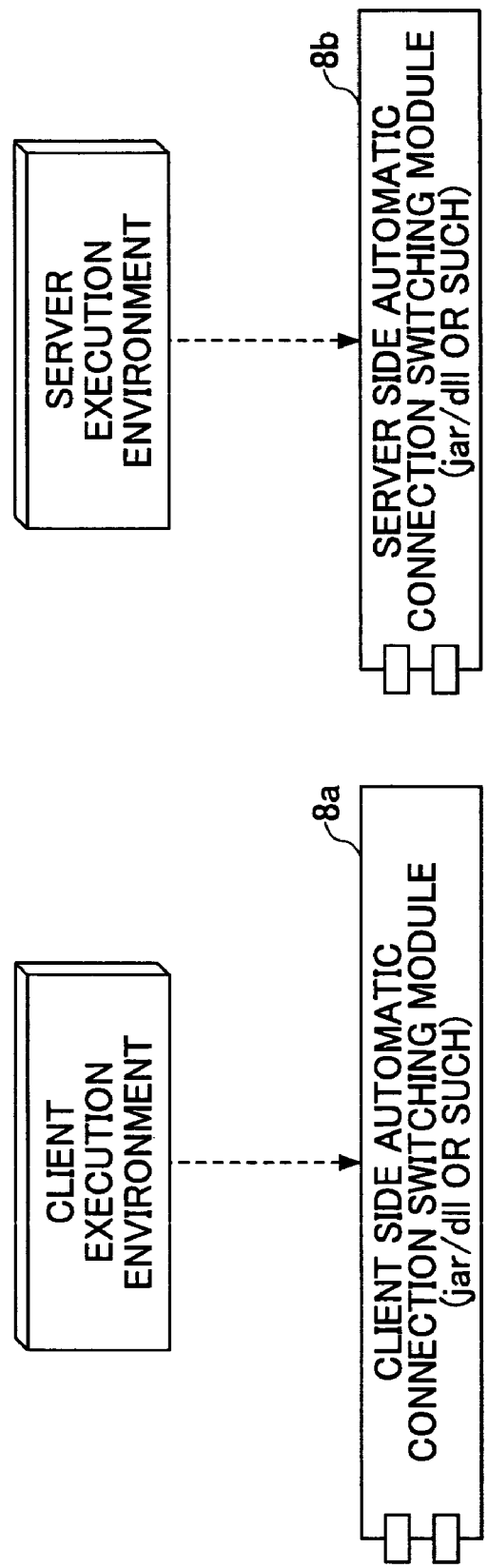
FIG. 24 shows an arrangement of the automatic connection switching module of the developing framework.

FIG. 24 shows a layout diagram of the automatic connection switching module of the developing framework, the client side automatic connection switching module 8a is disposed in a client execution environment such as a personal computer, and the server side automatic connection switching module 8b is disposed in a server execution environment.

Figure 25:
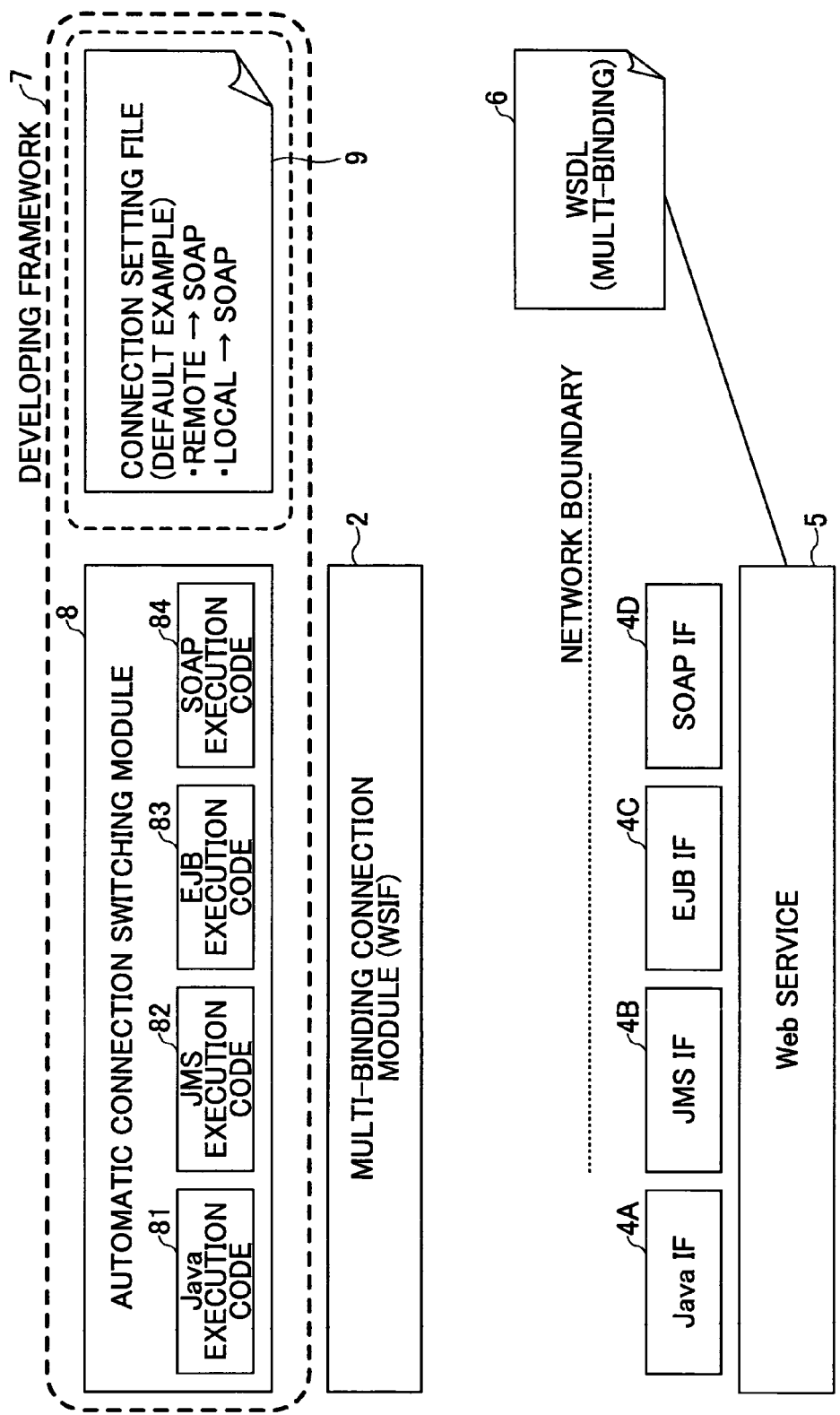
FIGS. 25 through 28 show examples of the developing procedures.
Figure 26:
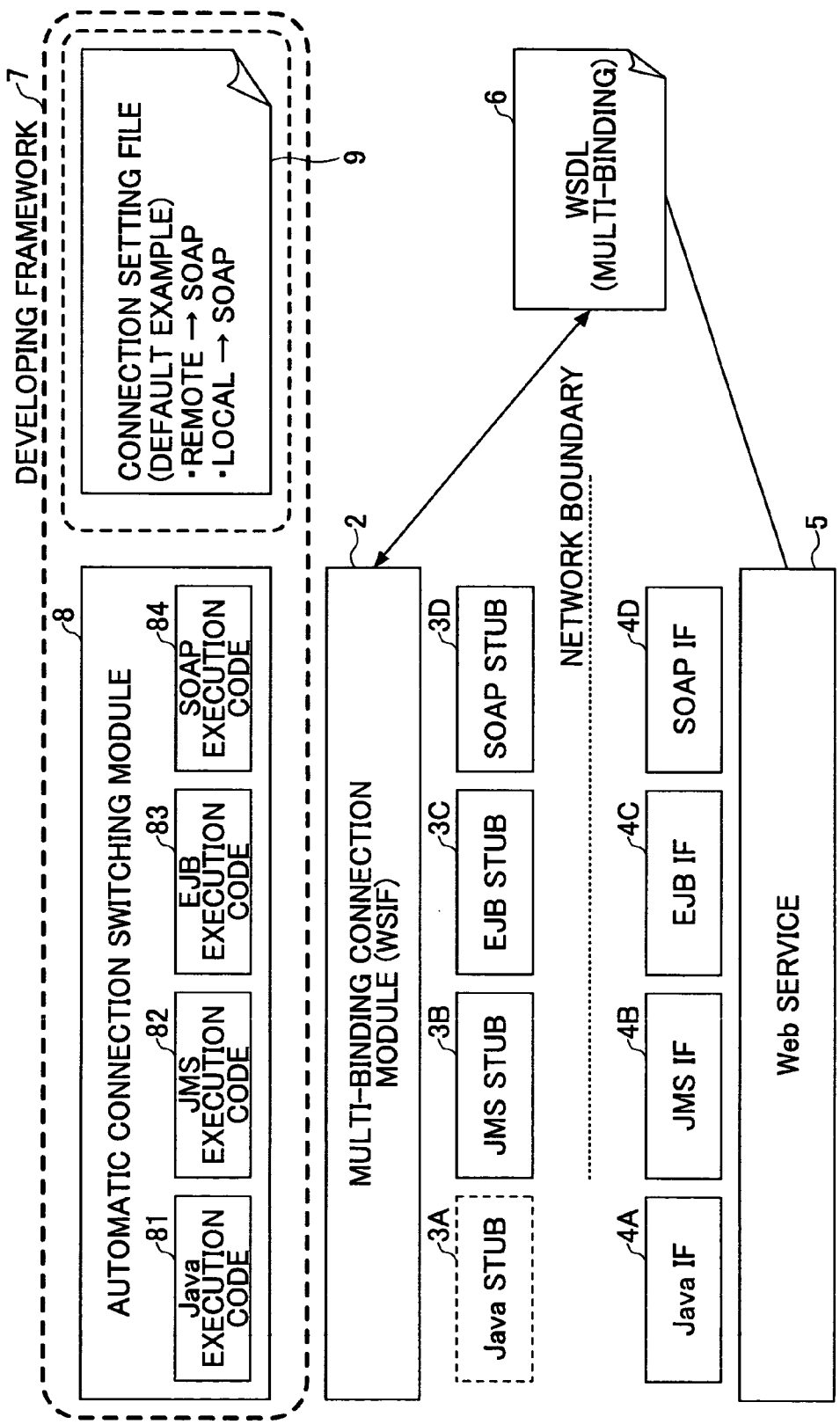
Figure 27:
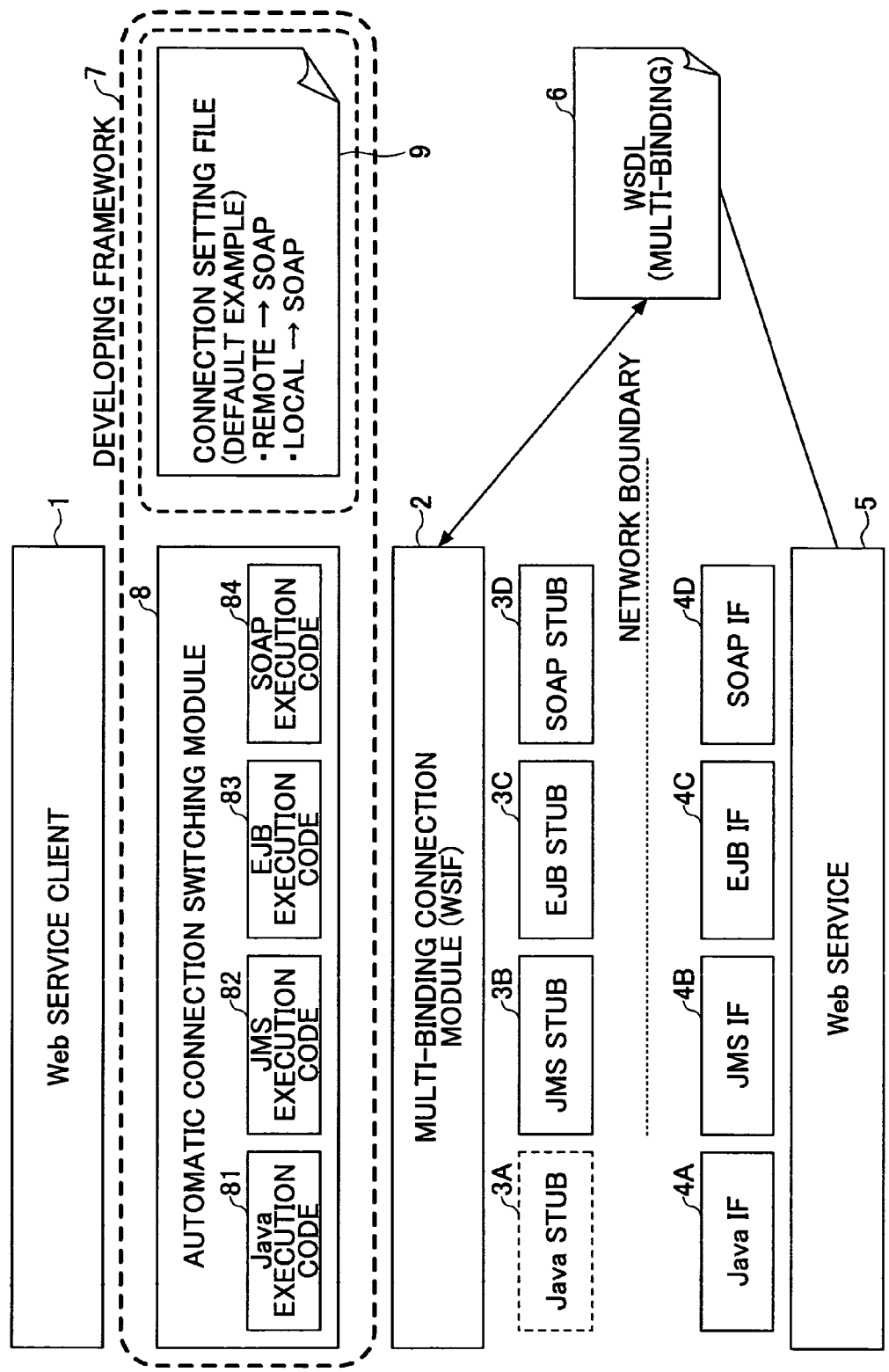
Figure 28:
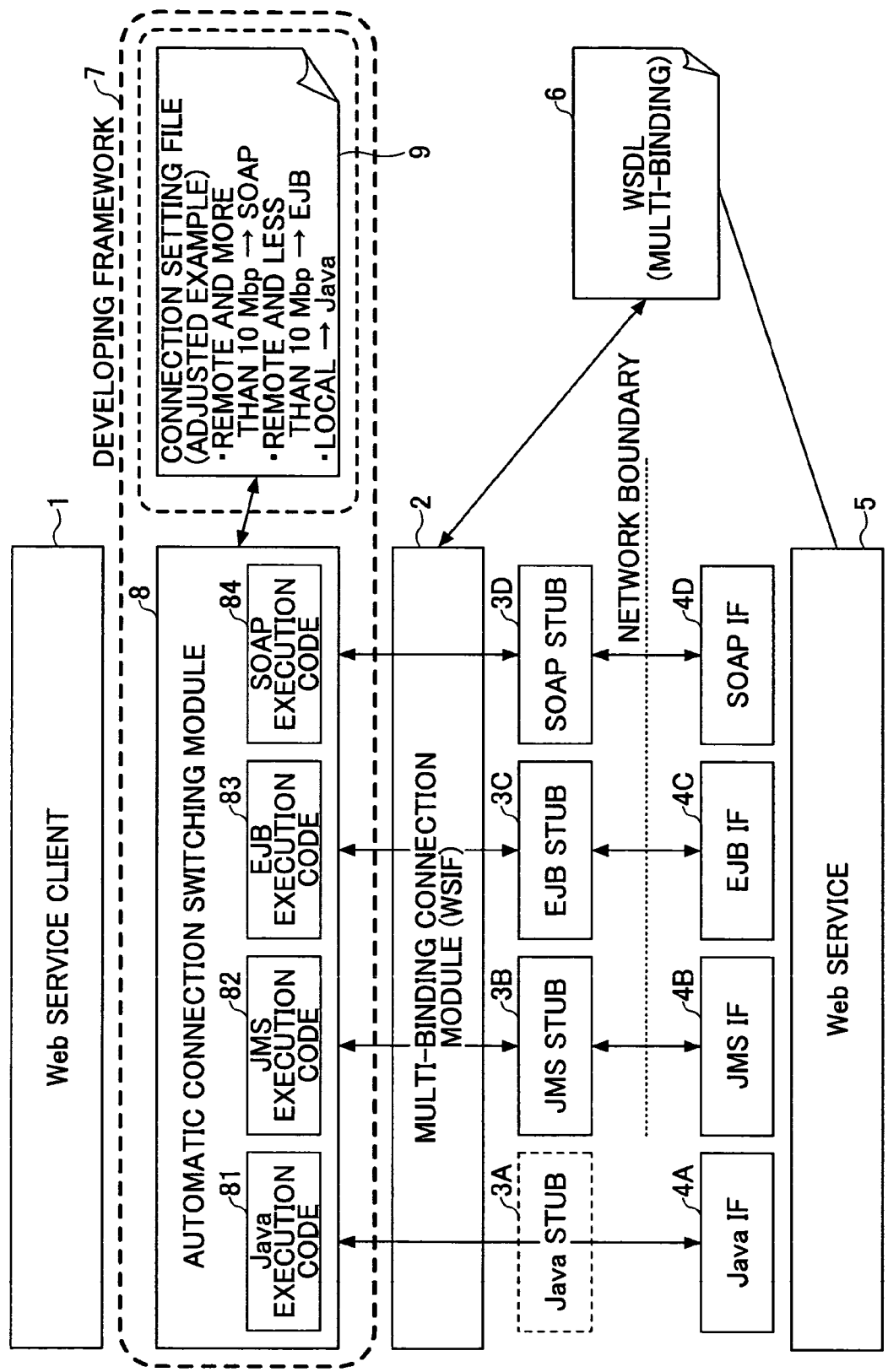

FIGS. 25 through 28 show an example of the developing procedure. First, as shown in FIG. 25, on the client side, the developing framework 7 and the multi-binding connection module 2 providing the client side automatic connection switching module 8 and the connection setting file 9 are disposed, and also, the server side interface 4A through 4D, the Web service 5 and the WSDL 6 are disposed. In this state, the set contents in the condition setting file 9 are still default ones. After that, as shown in FIG. 26, the multi-binding connection module 2 reads the WSDL 6, and generates the stubs 3A through 3D corresponding to the connection ways provided by the Web service 5. After that, as shown in FIG. 27, the Web service client 1 is provided. After that, as shown in FIG. 28, the connection setting file 9 is adjusted so as to provide an appropriate condition, and thereby, the Web service 3 can be connected from the Web service client 1 by means of the automatic connection switching module 8, the multi-binding connection module 2, the stub (3A through 3D) and the interface (4A through 4D).

Figure 29:
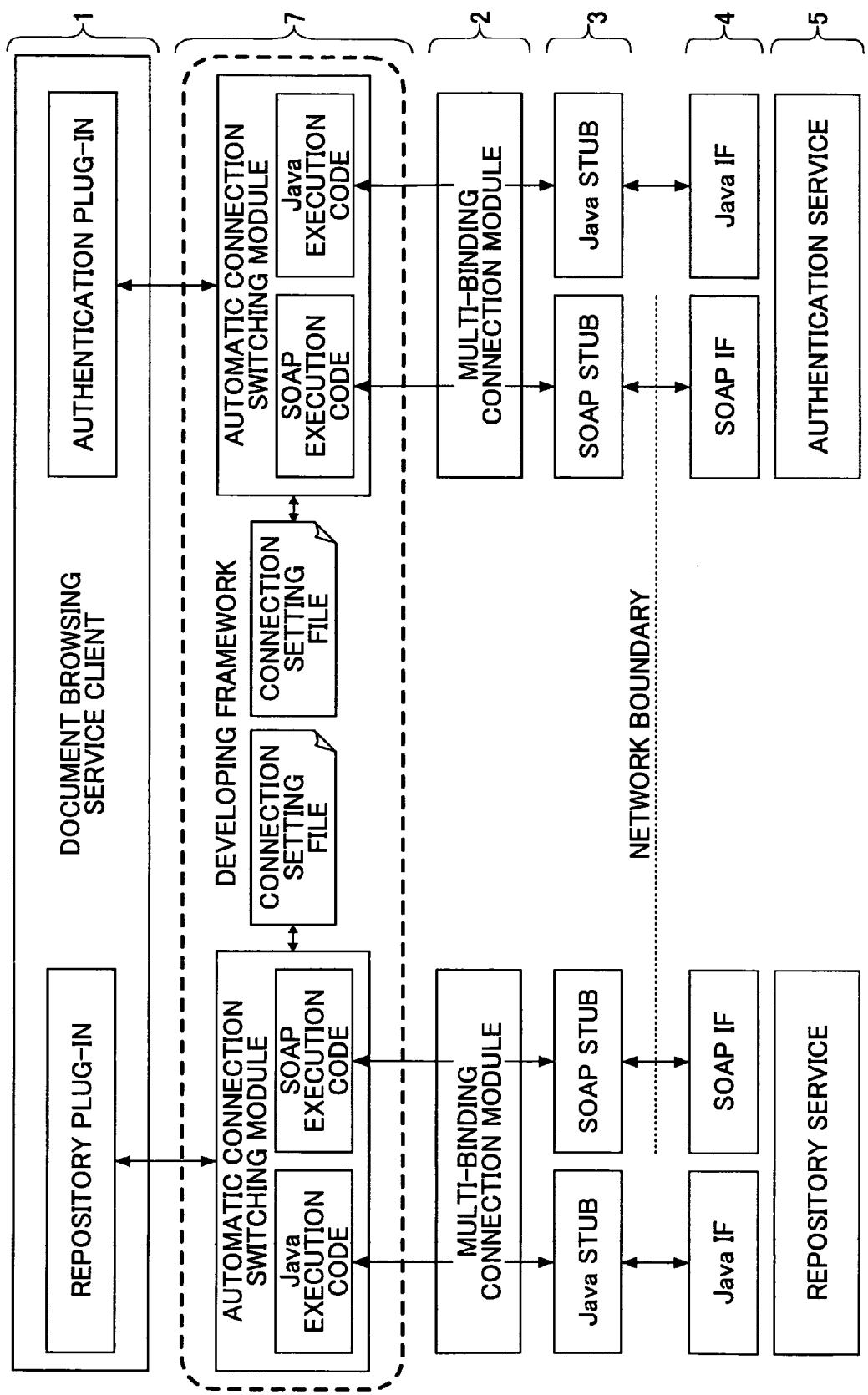
FIG. 29 shows an example of mounting of the Web service connection mechanism.

FIG. 29 shows an embodiment of the Web service connecting mechanism. In this configuration, the Web service client 1 is configured as a document browsing service client including a repository plug-in and an authentication plug-in, and, by means of the automatic connection switching module provided by the developing framework 7, the Web service 5 of the repository service and the authentication service is connectable by means of the multi-binding connection module 2, the stub 3 and the interface 4.

Thus, according to the present invention, binding is automatically selected based on the condition of the setting file (the condition of the IP address or the host name; the condition of the network communication rate; the condition of the machine information of the CPU, the memory or such; the condition of the execution mode based on the environment information, or such). As a result, flexible connection control can be provided. That is, the IF (Java) of local calling may be selected for a case where the server and the client are provided in the same location; the binding according to the transfer data amount of the network environment may be selected; the binding according to the CPU's processing capability may be selected; local (Java) may be selected during a development stage; or remote (SOAP) may be selected for an actual operation stage, for example. Further, connection switching is carried out by means of the automatic connection switching module provided by the developing framework, and the calling switching function is separated from the client code. As a result, the client code should not be changed even when the binding is changed. Further, the connection setting file may be managed from various locations, depending on a given particular environment.

Further, the present invention is not limited to the above-described embodiments, and variations and modifications may be made without departing from the basic concept of the present invention claimed below.

The present application is based on Japanese Priority Applications Nos. 2005-222978, 2005-222979, 2006-

191988 and 2006-191989, filed on Aug. 1, 2005, Aug. 1, 2005, Jul. 12, 2006 and Jul. 12, 2006, respectively, the entire contents of which are hereby incorporated herein by reference.

What is claimed is:

1. A Web service connecting apparatus for connecting to a Web service which provides a multi-binding function, comprising:
   a connection setting part storing a connection setting file which includes a selecting condition for a binding to use, and the selecting condition is a condition of an IP address or address name, a condition of a network communication rate, or a condition of machine information of a CPU;
   a common interface part receiving a connection request from a common interface execution code to be executed by a client;
   a reading and analyzing part obtaining the selecting condition from said connection setting part;
   an environment information obtaining part obtaining environment information of the client and/or a server;
   a connection selecting determination part automatically determining the binding to use based on the selecting condition and the environment information; and
   a calling part carrying out connection to the Web service with the execution code corresponding to the determined binding;
   wherein said connection setting part comprises a description that a Java binding is used by priority, when an IP address of the Web service to connect indicates a local host, and includes a description that any one of a SOAP binding, a JMS binding and an EJB binding is used by priority when said IP address indicates a remote host.

2. The Web service connecting apparatus as claimed in claim 1, wherein:
   said connection setting file is described in XML.

3. The Web service connecting apparatus as claimed in claim 1, wherein: said connection setting part comprises a description that the binding to be used by priority is designated according to a communication rate between the client and the server.

4. The Web service connecting apparatus as claimed in claim 1, wherein: said connection setting part comprises a description that the binding to be used by priority is designated according to whether or not an operating environment is a debug mode.

5. The Web service connecting apparatus as claimed in claim 1, wherein: said connection setting part is held by the client.

6. The Web service connecting apparatus as claimed in claim 1, wherein:
   said connection setting part is held by the server and read by the client.

7. The Web service connecting apparatus as claimed in claim 1, wherein: said connection setting part is held by a group of clients, and also is held by the server for another group of clients, which is then read by said another group of clients.

8. The Web service connecting apparatus as claimed in claim 1, wherein: said connection setting part is held by a service registry host, and is read by the client.

9. The Web service connecting apparatus as claimed in claim 1, wherein: said connection setting part is held by the service registry host, is read by the client, and also, is held by a group of clients.

10. The Web service connecting apparatus as claimed in claim 1, wherein: said reading/analyzing part is provided in the client.

11. The Web service connecting apparatus as claimed in claim 1, wherein: said reading/analyzing part is provided in the server.

12. The Web service connecting apparatus as claimed in claim 1, wherein: said environment information obtaining part comprises a client environment information obtaining part for obtaining the environment information of the client.

13. The Web service connecting apparatus as claimed in claim 1, wherein: said environment information obtaining part comprises a server environment information obtaining part for obtaining the environment information of the server.

14. The Web service connecting apparatus as claimed in claim 13, wherein: said server environment information obtaining part obtains the environment information of the server via a server environment information obtaining agent provided in the server.

15. The Web service connecting apparatus as claimed in claim 1, wherein: said common interface part separates initialization and service execution, and carries out initialization only once before executing the service execution.

16. The Web service connecting apparatus as claimed in claim 1, wherein: said common interface part carries out initialization and service execution at the same time.

17. The Web service connecting apparatus as claimed in claim 16, wherein: the initialization and the service execution are carried out by separate methods.

18. The Web service connecting apparatus as claimed in claim 16, wherein: the initialization and the service execution are carried out by a single method.

19. A Web service connecting method for connecting to a Web service which provides a multi-binding function, the method comprising:
   storing a connection setting file which includes a selecting condition for a binding to use, the selecting condition is a condition of an IP address or address name, a condition of a network communication rate, or a condition of machine information of a CPU;
   receiving a connection request from a common interface execution code to be executed by a client;
   a reading and analyzing part obtaining the selecting condition from said connection setting part;
   an environment information obtaining part obtaining environment information of the client and/or a server;
   obtaining environment information of the client and/or a server;
   automatically determining the binding to use based on the selecting condition and the environment information; and
   carrying out connection to the Web service with the execution code corresponding to the determined binding;
   wherein said connection setting part comprises a description that a Java binding is used by priority, when an IP address of the Web service to connect indicates a local host, and includes a description that any one of a SOAP binding, a JMS binding and an EJB binding is used by priority when said IP address indicates a remote host.

* * * * *